United States Patent
Satoh

(10) Patent No.: US 8,675,924 B2
(45) Date of Patent: Mar. 18, 2014

(54) ROAD ESTIMATION DEVICE AND METHOD FOR ESTIMATING ROAD

(75) Inventor: Taichi Satoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 155 days.

(21) Appl. No.: 13/301,830

(22) Filed: Nov. 22, 2011

(65) Prior Publication Data

US 2012/0128216 A1 May 24, 2012

(30) Foreign Application Priority Data

Nov. 24, 2010 (JP) ................................. 2010-261388

(51) Int. Cl.
*G06K 9/00* (2006.01)
(52) U.S. Cl.
USPC ........................................................ 382/113
(58) Field of Classification Search
None
See application file for complete search history.

(56) References Cited

U.S. PATENT DOCUMENTS

| | | | | |
|---|---|---|---|---|
| 5,790,973 | A * | 8/1998 | Blaker et al. ............... | 455/456.5 |
| 2005/0131642 | A1 | 6/2005 | Adachi | |
| 2008/0051971 | A1 | 2/2008 | Sung | |
| 2012/0128213 | A1 * | 5/2012 | Satoh ............................. | 382/113 |
| 2012/0128214 | A1 * | 5/2012 | Satoh ............................. | 382/113 |
| 2012/0128215 | A1 * | 5/2012 | Satoh ............................. | 382/113 |
| 2012/0128216 | A1 * | 5/2012 | Satoh ............................. | 382/113 |
| 2012/0128217 | A1 * | 5/2012 | Satoh ............................. | 382/113 |

FOREIGN PATENT DOCUMENTS

| | | |
|---|---|---|
| JP | A-09-160483 | 6/1997 |
| JP | A-2004-354395 | 12/2004 |
| JP | A-2006-275777 | 10/2006 |
| JP | A-2009-270953 | 11/2009 |
| JP | A-2009-300405 | 12/2009 |
| JP | A-2010-32243 | 2/2010 |
| JP | A-2011-75345 | 4/2011 |

OTHER PUBLICATIONS

U.S. Appl. No. 13/301,815, filed Nov. 22, 2011, Satoh.
U.S. Appl. No. 13/301,822, filed Nov. 22, 2011, Satoh.
U.S. Appl. No. 13/301,825, filed Nov. 22, 2011, Satoh.
U.S. Appl. No. 13/301,834, filed Nov. 22, 2011, Satoh.
U.S. Appl. No. 13/301,845, filed Nov. 22, 2011, Satoh.
Office Action mailed Feb. 19, 2013 in corresponding JP Application No. 2011-051765 (and English translation).
Office Action dated Oct. 28, 2013 in corresponding U.S. Appl. No. 13/301,845.
Office Action dated Oct. 25, 2013 in corresponding U.S. Appl. No. 13/301,815.
Office Action dated Dec. 3, 2013 in corresponding U.S. Appl. No. 13/301,834.

* cited by examiner

*Primary Examiner* — Shefali Goradia
*Assistant Examiner* — Amandeep Saini
(74) *Attorney, Agent, or Firm* — Posz Law Group, PLC

(57) ABSTRACT

A road estimation device receives data including a core point being assigned along a road and assigned with attributes for identifying the road. An input unit inputs map data including links having attributes corresponding to the attributes of the core point. An extraction unit first narrows down links into candidate links each having an attribute corresponding to a non-shape-relevant attribute of the core point. The extraction unit subsequently narrows down the candidate links into a candidate link having an attribute corresponding to a shape-relevant attribute of the core point, thereby to extract the candidate link pertinent to the road represented by the core point from the map data for estimating the road on a map.

11 Claims, 23 Drawing Sheets

FIG. 4

| LATITUDE | LATITUDE OF CP |
|---|---|
| LONGITUDE | LONGITUDE OF CP |
| IP FLAG | CP IS INTERSECTION OR NOT |
| VIRTUAL CP FLAG | CP IS VIRTUAL CP OR NOT |
| ATTRIBUTE FC (NON-SHAPE) | ROAD CLASSIFICATION |
| ATTRIBUTE FW (NON-SHAPE) | PHYSICAL ROAD TYPE |
| ATTRIBUTE RD (NON-SHAPE) | ROAD NUMBER OR ROAD OFFICIAL NAME (5 LETTERS MAX) |
| ATTRIBUTE IT (NON-SHAPE) | CLASSIFICATION OF INTERSECTION |
| ATTRIBUTE RDI (NON-SHAPE) | NAME OF INTERSECTION |
| ATTRIBUTE DD (NON-SHAPE) | LEGALLY PERMITTED DRIVE DIRECTION |
| ATTRIBUTE AFR (NON-SHAPE) | DD IS REFERABLE OR NOT |
| ATTRIBUTE BR (SHAPE) | GEOLOGICAL ANGLE TO SUBSEQUENT CP |
| ATTRIBUTE DMB (SHAPE) | LINEAR DISTANCE TO SUBSEQUENT CP |
| ATTRIBUTE CA (SHAPE) | ANGLE TO SIDE ROAD |
| ATTRIBUTE DCA (SHAPE) | CONNECTION DISTANCE TO SIDE ROAD |
| ATTRIBUTE PCI (SHAPE) | DRIVEWAY NUMBER AMONG MULTIPLE DRIVEWAYS |
| ATTRIBUTE PDM (SHAPE) | DISTANT DEGREE FROM LINE CONNECTING TO SUBSEQUENT CP |
| ATTRIBUTE PD (SHAPE) | DRIVE DISTANCE TO SUBSEQUENT CP WITH PD |

FIG. 5

| FC VALUE | FC CONTENT |
|---|---|
| 0 | MAIN ROAD |
| 1 | FIRST CLASS ROAD |
| 2 | SECOND CLASS ROAD |
| 3 | THIRD CLASS ROAD |
| 4 | FOURTH CLASS ROAD |
| 5 | FIFTH CLASS ROAD |
| 6 | SIXTH CLASS ROAD |
| 7 | SEVENTH CLASS ROAD |
| 8 | EIGHTH CLASS ROAD |
| 9 | NINTH CLASS ROAD |

FIG. 6

| FW VALUE | FW CONTENT |
|---|---|
| 0 | UNCLEAR |
| 1 | HIGHWAY |
| 2 | MULTIPLE DRIVEWAYS (NOT HIGHWAY) |
| 3 | SINGLE DRIVEWAY |
| 4 | ROTARY |
| 5 | TRAFFIC SQUARE |
| 6 | SURROUNDED TRAFFIC AREA |
| 7 | BYPASS |
| 8 | FEEDER ROAD |
| 9 | PARKING ENTRANCE / EXIT |
| 10 | SERVICE AREA ENTRANCE / EXIT |
| 11 | PEDESTRIAN ZONE |
| 12 | PASSAGE |

FIG. 7

| IT VALUE | IT CONTENT |
|---|---|
| 0 | UNDEFINED |
| 1 | HIGHWAY OR INTERCHANGE OF LIMITED ROAD |
| 2 | ROTARY |
| 3 | COMPLICATED INTERSECTION (NOT 1, 2) |
| 4 | SIMPLE INTERSECTION |
| 5 | TRAFFIC SQUARE |
| 6 | TWO-VALUE INTERSECTION |

OBJECT PARCEL

OBJECT PARCEL

| CASE | | PCI OF VIRTUAL CP |
|---|---|---|
| BOTH START-SIDE CP AND END-SIDE CP HAVE PCI | PCI COINCIDENT | SET SAME CP |
| | PCI NON-COINCIDENT | SET INVALID VALUE |
| EITHER START-SIDE CP OR END-SIDE CP HAS PCI | VIRTUAL CP IS CLOSE TO CP WITH PCI | SET SAME CP |
| | VIRTUAL CP IS NOT CLOSE TO CP WITH PCI | SET INVALID VALUE |
| NEITHER START-SIDE CP NOR END-SIDE CP HAS PCI | | SET INVALID VALUE |

| PDM/r | CORRECTION VALUE |
|---:|---:|
| 0.1 OR LESS | 0.6 |
| 1 | 1.0 |
| 4 | 2.7 |
| 8 | 5.2 |
| 16 | 10.3 |
| 32 | 20.4 |

ROAD ESTIMATION DEVICE AND METHOD FOR ESTIMATING ROAD

CROSS REFERENCE TO RELATED APPLICATIONS

This application is based on and claims priority to Japanese Patent Application No. 2010-261388 filed on Nov. 24, 2010.

The contents of Japanese Patent Applications No. 2010-261387 filed on Nov. 24, 2010, No. 2010-261388 filed on Nov. 24, 2010, No. 2011-4119 filed on Jan. 12, 2011, No. 2011-51764 filed on Mar. 9, 2011, No. 2011-51765 filed on Mar. 9, 2011, and No. 2011-124211 filed on Jun. 2, 2011 are incorporated in their entirely herein by reference.

TECHNICAL FIELD

The present invention relates to a road estimation device configured to extract a link corresponding to a road represented by core point including an attribute for identifying the road on a map. The present invention further relates to a method for estimating a road represented by the core point.

BACKGROUND

The vehicle information and communication system (VICS) is known as a conventional service for broadcasting traffic information. The present service is implemented to provide various kinds of traffic information and vehicle information to a user. For example, the VICS Center is caused to transmit traffic information, such as traffic congestion information about the road, to a vehicle. In addition, a vehicular device is caused to search map data for identifying a road. Furthermore, a display device is caused to change a display mode of a road according to the received traffic information. The present service enables a user to obtain traffic information such as traffic congestion information in real time.

An in-vehicle device stores map data including road data in a format defined with links and nodes. A link represents a road having nodes being termination points. The VICS Center transmits the VICS Link being information for identifying roads. The VICS link is assigned with various traffic information and change instruction information on a display mode. A vehicular device has a position reference table for comparing the VICS Link with links in the map data. The in-vehicle device searches a link corresponding to the VICS Link with reference to the table. That is, the position reference table is requisite for the VICS system (see, for example, JP-A-2006-275777 and JP-A-2009-270953).

As an alternative service to the VICS system, it is conceived to utilize data of traffic information transmitted in the form of transport protocol expert group (TPEG) to a terminal device such as a vehicular device. It is noted that in the case of TPEG data being transmitted, position information is represented in the form of, for example, dynamic location referencing data (DLR data). The position information includes core points each having position coordinates and attributes for identifying a road. In general, the core point is distributed in the form of multiple arrays arranged along the road. In the system where the core points are used to represent position information, a position reference table, which may vary in dependence upon difference in manufacturer of the map data, the format and the version of the map data, and the like, is unnecessary. That is, the system using the core points enables identification of a road (link) on the map data, regardless of the map data in the in-vehicle device.

To the contrary, the system using the core points needs various processings for identifying a road according to the core points. For example, as described above, various kinds of map data exist. Therefore, core points do not necessarily exist on a road of map data. Therefore, it is necessary to implement a processing to identify a link pertinent to a road represented by core points on a map.

It is necessary to extract a link on the map data in order to estimate the road represented by core points. It is noted that, when a large number of links exist as an extraction object, a method is required for extracting a candidate from the links with efficiency and accuracy.

SUMMARY

In view of the foregoing and other problems, it is an object of the present invention to produce a road estimation device configured to extract a pertinent link on map data of a vehicular device efficiently and accurately from distributed information on a core point, thereby to estimate a road represented by the core point. It is another object to produce a method for estimating a road represented by the core point.

According to an aspect of the present invention, a road estimation device configured to receive data including a core point from an external object, the core point being assigned along a road and being assigned with attributes for identifying the road, the road estimation device further configured to extract a link pertinent to the road represented by the core point for estimating the road on a map, the road estimation device comprises a map data input unit configured to input map data including links having attributes corresponding to the attributes of the core point. The road estimation device further comprises a link extraction unit configured to extract a candidate link being candidate of the road represented by the core point from the map data according to the attribute of the link and the attributes of the core point. The link extraction unit is further configured to: first implement a non-shape-relevant narrowing-down processing to narrow down links into candidate links, each of which has an attribute corresponding to a non-shape-relevant attribute of the attributes of the core point, according to the non-shape-relevant attribute being irrelevant to a road shape; and subsequently implement a shape-relevant narrowing-down processing to narrow down the candidate links into a candidate link, which has an attribute corresponding to a shape-relevant attribute of the attributes of the core point, according to the shape-relevant attribute being relevant to the road shape.

According to another aspect of the present invention, a method for estimating a road, the method comprises receiving data including a core point from an external object, the core point being assigned along a road and being assigned with attributes for identifying the road, the attributes of the core point including a non-shape-relevant attribute and a shape-relevant attribute, the non-shape-relevant attribute being irrelevant to a road shape, and the shape-relevant attribute being relevant to the road shape. The method further comprises inputting map data including links each having an attribute. The method further comprises first narrowing down links into candidate links each having an attribute corresponding to the non-shape-relevant attribute of the core point. The method further comprises second narrowing down the candidate links into a candidate link having an attribute corresponding to the shape-relevant attribute of the core point thereby to extract the candidate link being candidate of the road represented by the core point from the map data.

BRIEF DESCRIPTION OF THE DRAWINGS

The above and other objects, features and advantages of the present invention will become more apparent from the following detailed description made with reference to the accompanying drawings. In the drawings:

FIG. 4 is an explanatory view showing attributes of a CP after conversion;

FIG. 5 is an explanatory view showing values of an attribute FC and associated contents;

FIG. 6 is an explanatory view showing values of an attribute FW and associated contents;

FIG. 7 is an explanatory view showing values of an attribute IT and associated contents;

DETAILED DESCRIPTION

Embodiment

As follows, embodiments will be described with reference to drawings.

<1. Configuration of Navigation Device>

The configuration of a navigation device will be first described with reference to FIG. 1. A navigation device 10 shown in FIG. 1 may function as a road estimation device. Specifically, the navigation device 10 is configured to receive transport protocol expert group data (TPEG data), to implement matching of a road based on position information contained in the data, and to implement indication of traffic information transmitted with position information correspondingly to the road.

Figure 1:
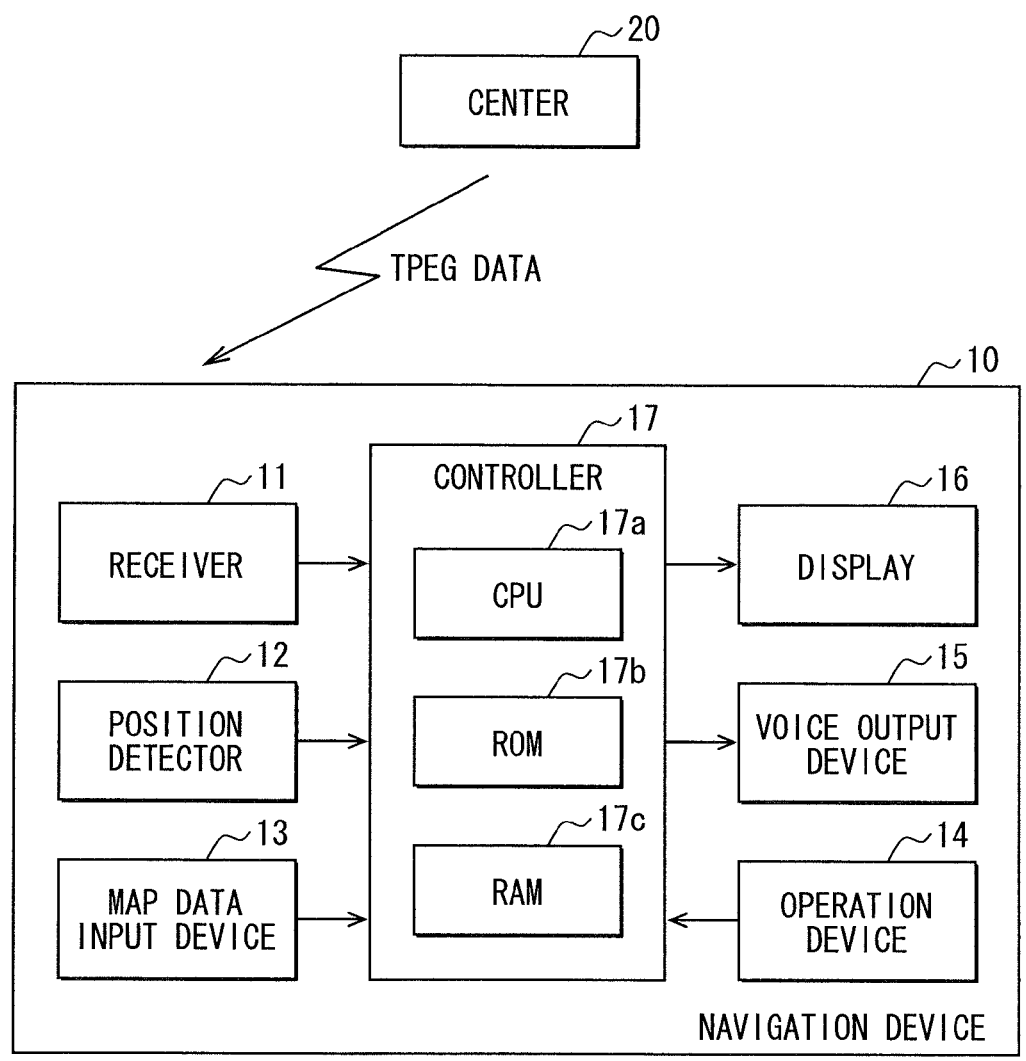
FIG. 1 is a block diagram showing a configuration of a navigation device.

The navigation device 10 shown in FIG. 1 includes a receiver device 11, a position sensing device 12, a map data input device 13, an operation device 14, a voice output device 15, an indication device 16, and a control circuit 17.

The receiver device 11 is for receiving the TPEG data from a center 20. The navigation device 10 causes the control circuit 17 to implement tuning thereby to obtain the TPEG data through the receiver device 11.

The position sensing device 12 is for detecting the present position of the vehicle equipped with the navigation device 10. The position sensing device 12 includes various devices such as a generally-known gyroscope, a distance sensor, and/or a GPS receiver.

The map data input device 13 includes a storage medium such as a hard disk and/or a DVD device storing map data. The map data input device 13 is configured to input map data stored in the storage medium into the control circuit 17. The map data input device 13 may include a DVD drive in addition to the hard disk storing the map data. With the map data input device 13, the navigation device 10 is configured to install additional data of the map data into the hard disk. The additional data may be an optional supply and may be sold as a DVD medium. The map data is managed in a unit of parcel and cashed in the unit of the parcel.

The operation device 14 is for enabling a user to input an instruction into the control circuit 17. The operation device 14 may include a touch panel located at the indication device 16, an operation switch group equipped on the surface of a main body of the navigation device 10, and/or in a remote controller, and/or the like. The user is enabled to implement various operations of the navigation device 10, such as a destination determining operation, a scale change operation of the map, and/or a scrolling operation of the map, via the operation device 14.

The voice output device 15 includes an audio device such as a speaker for outputting a guidance voice and/or the like to a user, in response to a signal from the control circuit 17. The indication device 16 has a full color indication function. The indication device 16 is configured to overlap traffic information, which is generated based on the TPEG data obtained by the receiver device 11, on a map image generated based on the map data received from the map data input device 13.

The control circuit 17 has a configuration similar to a generally-known microcomputer and includes components, such as a CPU 17*a*, a ROM 17*b*, a RAM 17*c*, an I/O device, and a bus line connecting the components. The CPU 17*a* implements various operations according to the program stored in the ROM 17*b*. The receiver device 11 may receive the TPEG data including information such as the position information being dynamic location referencing data (DLR data). The control circuit 17 estimates a pertinent road in the map data based on the position information.

<2. Function of Control Circuit>

Figure 2:
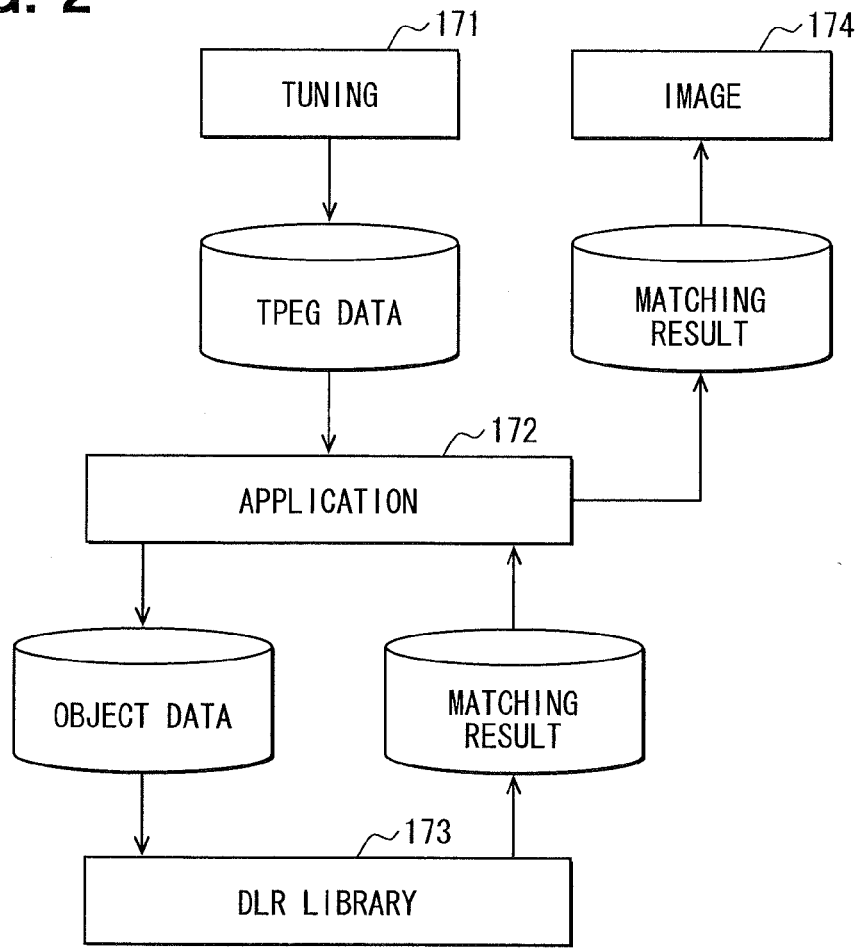
FIG. 2 is a functional block diagram showing an operation of a control circuit.

Subsequently, the function of the control circuit 17 related to processings of the TPEG data will be described with reference to FIG. 2. FIG. 2 is an explanatory view showing the function of the control circuit 17.

The function of the control circuit 17 is categorized into a tuning block 171, an application block 172, a DLR library block 173, and an image block 174. The tuning block 171 is configured to receive the TPEG data via the receiver device 11. That is, the tuning block 171 has the above-described tuning function. The tuning block 171 sends the received TPEG data to the application block 172.

The application block 172 is a function produced by an application program. The application program is stored in the ROM 17*b* and executed by the CPU 17*a*.

The application block 172 manages the TPEG data sent from the tuning block 171 and updates the TPEG data when receiving new TPEG data. The application block 172 further includes information for identifying a parcel (object parcel) being an indicated object to be indicated on the screen. The screen may include a single object parcel or may include multiple object parcels such as nine object parcels, in dependence on a scale size. The application block 172 sends information on the object parcel and position information of TPEG data as object data to the DLR library block 173.

The DLR library block 173 is a function produced by a DLR library program. Similarly to the application program, the DLR library program is stored in the ROM 17*b* and executed by the CPU 17*a*.

The DLR library block 173 executes a matching processing described later. The matching processing is implemented to estimate a pertinent road (link) in the map data inputted from the map data input device 13 according to the position information of the TPEG data. In advance of the matching processing, the DLR library block 173 reads the map data from the map data input device 13 into the RAM 17*c* on request caused by the application block 172. The DLR library block 173 sends the result of the matching processing as a matching result to the application block 172.

The application block 172 manages the matching result. Further, the image block 174 implements map update based on the matching result. Thus, as described above, the traffic information based on the TPEG data is overlapped on the map image based on the map data inputted from the map data input device 13.

<3. Matching Processing>

Figure 3:
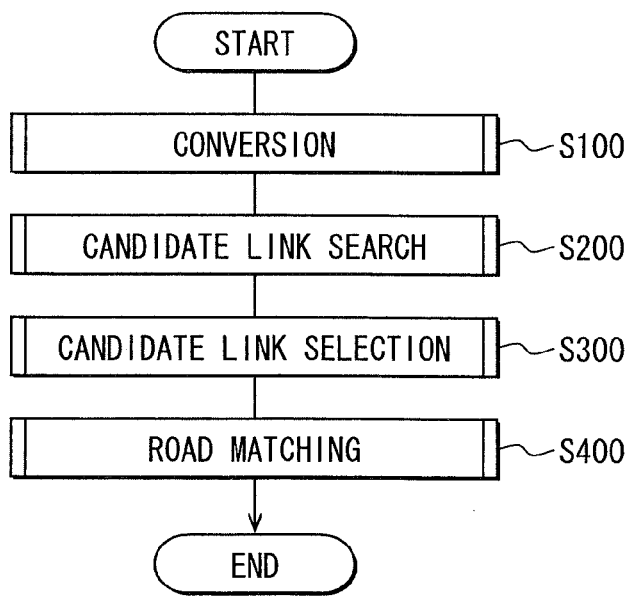
FIG. 3 is a flow chart showing a matching processing.

As described above, the DLR library block 173 is configured to implement the matching processing. As follows, the matching processing will be described. FIG. 3 is a flow chart showing the matching processing.

At S100, a conversion processing is implemented. The conversion processing is implemented to convert the position information (binary data) as DLR of the TPEG data into intermediate data. As already stated, discrete points are mainly used as the position information of the TPEG data. These discrete points are core points (CPs). The CPs have various attributes. In the present configuration, attributes necessary for the road estimation processing are retrieved to generate intermediate data.

<3.1 Attributes of Converted CPs>

FIG. 4 shows attributes included in the CPs converted into the intermediate data. In general, multiple CPs are transmitted as the position information of the TPEG data. Therefore, the CPs are managed as data array. The position may be estimated based on a single CP. In this case, a single CP may be transmitted.

Referring to FIG. 4, the CP includes the latitude, the longitude, an IP flag, and a virtual CP flag fundamental attributes. The latitude is the coordinates representing the latitude of the CP, and the longitude is the coordinates representing the longitude of the CP. The IP flag represents whether the CP is an intersection. The IP flag is set at 1 when the CP represents an intersection, and the IP flag is set at 0 otherwise. The virtual CP flag represents whether the CP is a virtual CP. The virtual CP flag is set at 1 when the CP represents a virtual CP, and the virtual CP flag is set at 0 otherwise. The virtual CP will be described later.

The CP includes various attributes about a road, which connects CPs. The attribute is categorized into a shape-relevant attribute related to a road shape and a non-shape-relevant attribute, which is not related to a road shape. First, the non-shape-relevant attribute will be described.

<3.1.1 Non-Shape-Relevant Attribute>

An attribute FC represents a road classification. As shown by the example of FIG. 5, a road is classified into ten levels including 0 to 9 levels. The number 0 represents a main road, the number 1 represents the first class road, and the number 2 represents the second class road. Similarly, the road is classified into levels from the third class road represented by 3 to the ninth class road represented by 9. For example, the main road is connected to a country or a capital, and the first class road is a national highway connecting major cities therebetween.

An attribute FW represents a physical road type. As shown by one example of FIG. 6, the physical road type is classified into thirteen categories including 0 to 13. In FIG. 6, 0 represents unclear, 1 represents a highway, 2 represents multiple-lane driveway excluding a highway, 3 represents a single-lane driveway, 4 represents a rotary, 5 represents a traffic square, 6 represents a surrounded traffic area, 7 represents a bypass, 8 represents a feeder road, 9 represents an inlet or an outlet of a parking space, 10 represents an inlet or an outlet of a service area, 11 represents a pedestrian zone, and 12 represents a passage.

An attribute RD represents an RD value being the route number, if a road is assigned with the route number. For example, the RD value may represent a national route number, such as "1" in a case where the road is the route 1. When the route number does not exist, a road name is assigned as the RD value. Referring to FIG. 4, the road name includes five characters of a formal name at maximum.

In FIG. 4, an attribute IT represents the classification (intersection classification) of an intersection. As shown by one example of FIG. 7, the intersection classification is classified into seven categories including 0 to 6. In FIG. 7, 0 represents undefined, 1 represents a highway or a speed-limited interchange, 2 represents a rotary, 3 represents a complicated intersection other than the categories of 1 and 2, 4 represents a simple intersection, 5 represents a traffic square, and 6 represents a two-value intersection where a route number or a road name changes.

In FIG. 4, an attribute RDI represents the name of an intersection.

In FIG. 4, an attribute DD represents a legally-permitted driving direction. For example, 0 represents that legally-permitted driving direction is undefined, 1 represents that legally-permitted driving direction is the forward direction, 2 represents that legally-permitted driving direction is the backward direction, and 3 represents that legally-permitted driving direction is both directions. An attribute AFR is a flag, which represents whether the attribute DD is referable. The attribute AFR is set at 1 when the attribute DD has a value of one of 0 to 3. Otherwise, the attribute AFR is set at 0 to represent that the attribute DD is non-referable when the attribute DD does not have a value.

<3.1.2 Shape-Relevant Attribute>

Subsequently, the shape-relevant attribute will be described.

In FIG. 4, an attribute BR represents the geographical angle to the subsequent CP. As described above, multiple CPs are, in general, managed as data arrays. The attribute BR represents a value being the angle in the clockwise direction relative to the north direction.

In FIG. 4, an attribute DMB represents the linear distance to the subsequent CP. Similarly to the attribute BR, the attribute DMB represents a value of the linear distance to the subsequent CP, since the subsequent CP exists in general. An attribute CA represents the angle relative to a side road. The side road is a minor road, which is not assigned with a route number. When a side road exists, the attribute CA is assigned to represent a value being the angle to the side road. The attribute CA is a positive value when the side road is in the clockwise direction with respect to the angle of the attribute BR, and is a negative value when the side road is in the counterclockwise direction with respect to the angle of the attribute BR. An attribute DCA represents the connection distance to the side road.

That is, the attribute CA represents the direction of the vector from the CP, and the attribute DCA represents the volume of the vector from the CP. Therefore, the position coordinates are determined by the attribute CA and the attribute DCA. The position coordinates represent the point where the side road exists.

In FIG. 4, an attribute PCI represents one of driveways (roads) being selected when multiple driveways exist in the same direction. The attribute PCI includes the number of driveways and a sequence number representing the order of the object road in the driveways.

In FIG. 4, an attribute PDM represents the spaced distance by which the object road is spaced from a straight line connected to the subsequent CP. The spaced distance represents the maximum distance to the object road. In FIG. 4, an attribute PD represents the travel distance along the object road to the CP including the subsequent attribute PD.

Figure 8:
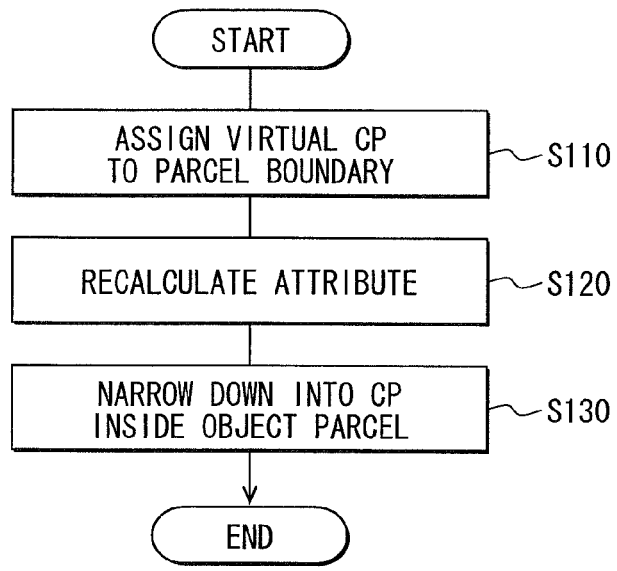
FIG. 8 is a flow chart showing a conversion processing in the matching processing.

As described above, the attributes of a CP being converted into intermediate data are described. In the conversion of the CP, the virtual CP is added, and recalculation of the attributes of the CP is implemented. FIG. 8 shows the detailed processing of the conversion.

<4. Detail of Matching Processing (First Half)>

Figure 9:
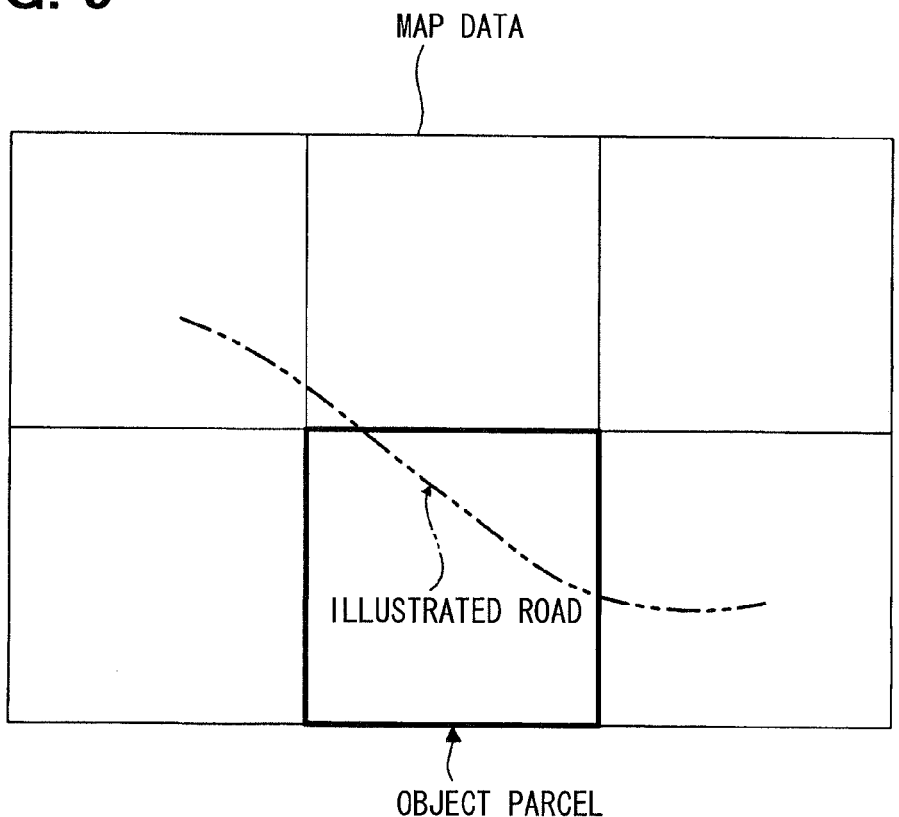
FIG. 9 is an explanatory view showing a road represented by CPs existing over an object parcel.

In FIG. 8, at S110, a virtual CP is assigned to a boundary of an object parcel. FIG. 9 is an explanatory view showing a two-dot chain line indicating a road shape represented by CPs for convenience. The object is to estimate such a road shape and to implement matching of the estimated road shape with a road represented by a link array of the map data. It is noted that the road shape indicated by the two-dot chain line in FIG. 9 is an example simplified for convenience of explanation and does not represent an actual road shape. The array of CPs may be within an object parcel. Otherwise, it is further noted that, as shown in FIG. 9, the array of CPs may extend beyond the object parcel to a parcel around the object parcel. In such a case, a virtual CP is assigned to the boundary of the object parcel.

Figure 10A:
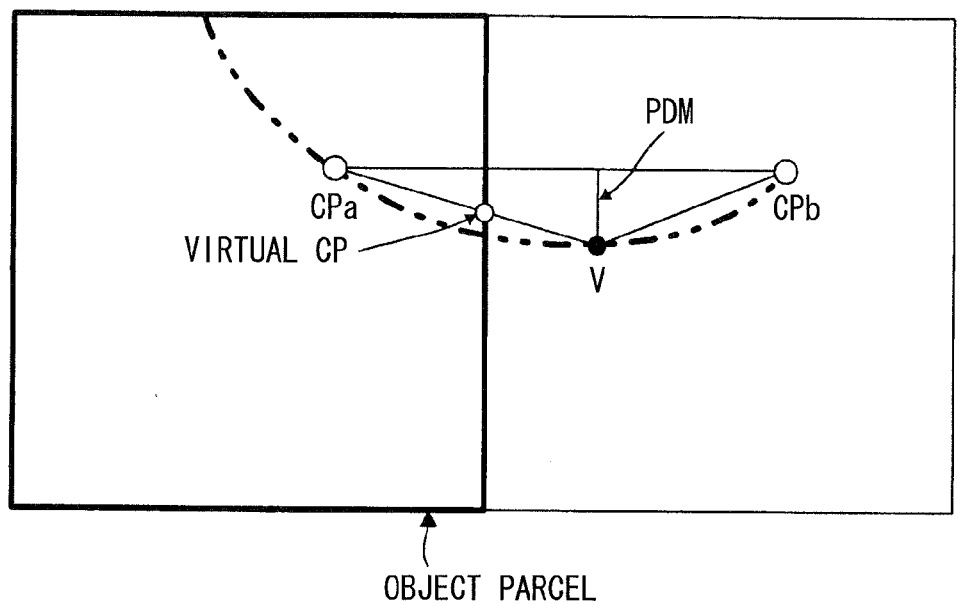
FIGS. 10A, 10B are explanatory views showing assignment of a virtual CP and a processing in a parcel boundary.

Specifically, FIG. 10A shows a case where two CPa and CPb are located through the boundary of the object parcel. In such a case, a peak V of the road shape can be derived from the value of the attribute PDM. In addition, a line segment, which connects the peak V of the road shape with the CPa, and a line segment, which connects the peak V with the CPb, are also derived. Thus, the virtual CP is assigned to the intersection between one of the line segments and the boundary of the object parcel. As follows, the CPs are represented as CPa, CPb, CPc, and the like by adding symbols a, b, c and the like in order to distinguish multiple CPs.

<4.1 Recalculation of Attributes>

At subsequent S120, the attributes of CPs are recalculated. Since the virtual CP is assigned, the CP on the end side (end-side CP) is excluded from CPs to be processed (described later). In the example of FIG. 10A, the CPb on the end side is excluded from CPs to be processed. Therefore, the attributes of the CP on the start side (start-side CP) and the attributes of the virtual CP are recalculated. In the example of FIG. 10A, the attributes of the CPa and the attributes of the virtual CP are recalculated. The attributes to be recalculated include the attribute BR, the attribute DMB, the attribute PCI, the attribute CA, the attribute DCA, the attribute PDM, and the attribute PD.

Referring to FIG. 4, the attribute BR and the attribute DMB respectively represent the angle relative to the subsequent CP and the linear distance from the subsequent CP. Therefore, the angle relative to the subsequent CP and the linear distance from the subsequent CP including the newly assigned virtual CP are calculated and set.

The attribute CA and the attribute DCA of the CP on the start side are not recalculated. In the example of FIG. 10A, the attribute CA and the attribute DCA of the CPa are not recalculated. The attribute CA and the attribute DCA of the virtual CP are set at invalid values. The processing is implemented in this manner, since the attribute CA and the attribute DCA are related with a side road, and such information on a side road is not applicable to the virtual CP.

Referring to FIG. 4, the attribute PCI is related to the number of driveways (roads, lanes) extending in parallel. Therefore, the attribute PCI of the CP on the start side is not recalculated. In the example of FIG. 10A, the attribute PCI of the CPa is not recalculated. The attribute PCI of the virtual CP is set in accordance with the attributes PCI of the CPs on the start side and on the end side. In the example of FIG. 10A, the attribute PCI of the virtual CP is set in accordance with the attributes PCI of the CPa and the CPb.

Figures 11, 12:
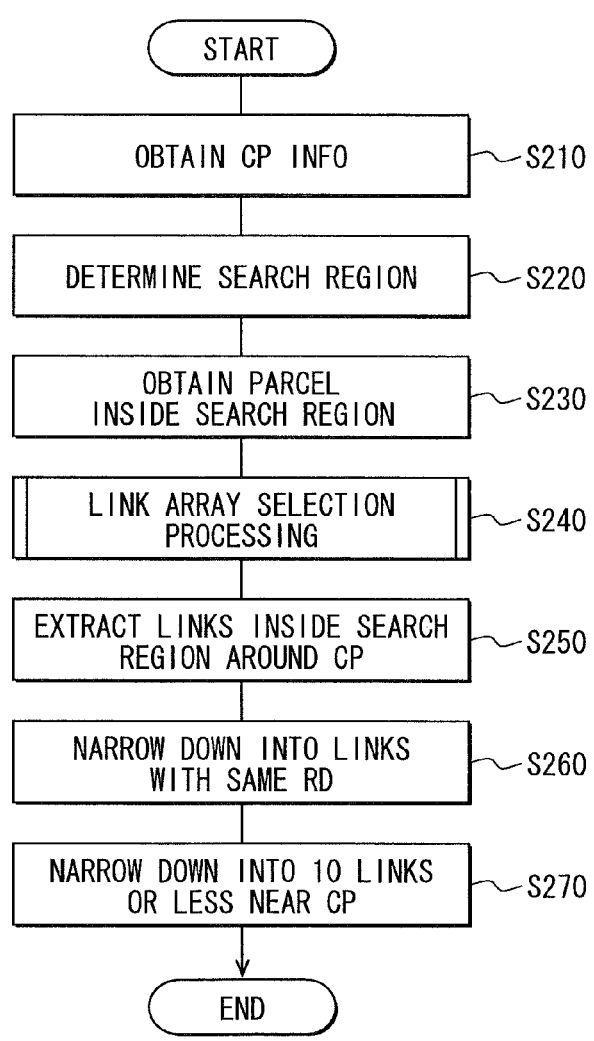
FIG. 11 is an explanatory view showing a determination rule of an attribute PCI.
FIG. 12 is a flow chart showing a candidate link search processing in the matching processing.

FIG. 11 shows a detailed calculation rule of the attribute PCI of the virtual CP. When the CP on the start side and the CP on the end side respectively have the attributes PCI and when the attributes PCI of both the CPs coincide with each other, the attribute PCI of the virtual CP is set at the same value of the attributes PCI of both the CPs. Otherwise, when the attributes PCI of both the CPs do not coincide with each other, the attribute PCI of the virtual CP is set at an invalid value.

When one of the CP on the start side and the CP on the end side has the attribute PCI and when the virtual CP is located in the vicinity of the CP, which has the attribute PCI, the attribute PCI of the virtual CP is set at the value of the attribute PCI of the one CP. Otherwise, when one of the CP on the start side and the CP on the end side has the attribute PCI and when the virtual CP is not located in the vicinity of the CP, which has the attribute PCI, the attribute PCI of the virtual CP is set at an invalid value. In the present cases, the virtual CP is determined to be located in the vicinity of the CP having the attribute PCI when, for example, the linear distance from the virtual CP to the CP having the attribute PCI is 10% or less of the linear distance between the CP on the start side and the CP on the end side.

Otherwise, when both the CP on the start side and the CP on the end side do not have the attribute PCI, the attribute PCI of the virtual CP is set at an invalid value. In FIG. 4, the attribute PDM represents the spaced distance by which the object road is spaced from the straight line connected to the subsequent CP. The value of the attribute PDM before being assigned with the virtual CP is multiplied by a correction value to set the attribute PDM. Specifically, a divisional rate of the virtual CP is calculated, and a correction value is calculated by using the subsequent formula.

(i) When the divisional rate is less than 50%, correction value=0.6×divisional rate/100 (Formula 1)

(ii) When the divisional rate is greater than or equal to 50%, correction value=1.4×divisional rate/100−0.4 (Formula 2)

The divisional rate is calculated by using the subsequent formula.

The divisional rate, when the attribute PDM of the CP on the start side is recalculated, is:

linear distance between start-side CP and virtual CP/total linear distance between start-side CP and end-side CP (Formula 3)

The divisional rate, when the attribute PDM of the virtual CP is recalculated, is:

linear distance between virtual CP and end-side CP/total linear distance between start-side CP and end-side CP (Formula 4)

The total linear distance is the summation of the linear distances of the linear paths from the CP on the start side to the CP on the end side through the virtual CP. That is, the total linear distance is the summation of the linear distance between the CP on the start side and the virtual CP and the linear distance between the virtual CP and the CP on the end side.

Referring to FIG. 4, the attribute PD is the travel distance to the subsequent CP having the attribute PD and is not necessarily assigned to all the CPs. Therefore, two CPs located beyond a parcel boundary may not have the attribute PD. Therefore, recalculation is implemented using one of CPs having the attribute PD and closest to the virtual CP. When a CP, which has the attribute PD, does not exist, recalculation of the attribute PD is not implemented.

In the recalculation of the attribute PD, the value of the attribute PD assigned to the CP is divided proportionally according to the linear distance to the virtual CP. That is, the value of the attribute PD of the CP is calculated by multiplying the original value of the attribute PD of the CP by the divisional rate calculated by using the formula 3. In addition, the value of the attribute PD of the virtual CP is calculated by multiplying the original value of the attribute PD of the CP on the start side by the divisional rate calculated by using the formula 4.

<4.2 Narrowing Down Processing of CPs>

Referring to FIG. 8, at S130, narrowing down processing of CPs within the object parcel is implemented. The present processing is implemented to set only the CPs including the virtual CP within the object parcel to obtain the processing object. An array of CPs may extend beyond a boundary of an object parcel. Nevertheless, it suffices to implement the matching only to the object parcel being an indicated object of the application.

<4.2.1 Method for Not Assigning Virtual CP>

In the present embodiment, a CP exists on the boundary of the object parcel, since the virtual CP is assigned. On assumption this, the processing object is defined by the virtual CP. It is noted that the processing may be implemented by using an original CP, which is included in the DLR data being provided, as a CP on the end side of an object parcel.

Figure 10B:
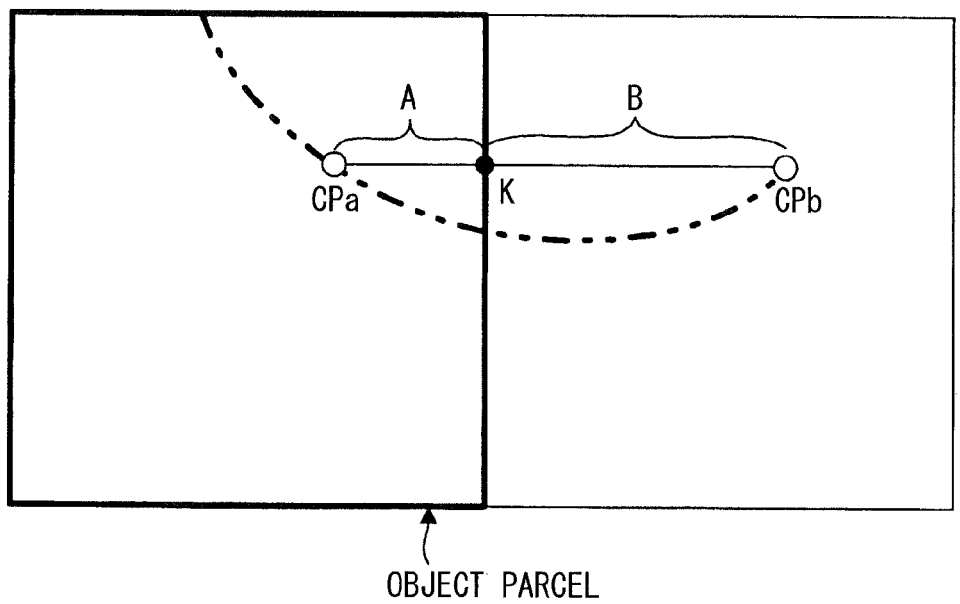

For example, as shown in FIG. 10B, in the case where the CPs extend over the boundary of the object parcel, the CPa in the object parcel may be used as the CP on the end side. Alternatively, the CPb, which first appears outside the object parcel may be used as the CP on the end side. It is noted that the CPa and/or the CPb may be away from the boundary of the object parcel. In consideration of this, for example, one of the CPa and the CPb may be selected as the CP on the end side, according to the distance of the CPa and the CPb from the boundary of the object parcel.

As one example, as shown in FIG. 10B, it is conceived to calculate an intersection K between a straight line, which connects the CPa with the CPb, and the boundary of the object parcel and to determine the distant degrees according to the linear distance A to the intersection K and the linear distance B to the intersection K.

In this case, one example is conceived to set the CPb, which is outside the object parcel, as the CP on the end side normally. In this example, the CPa inside the object parcel may be otherwise set as the CP on the end side when the linear distance B is greater than or equal to a predetermined value. In this example, the region defined by the CPb may become the processing object. Therefore, the road can be searched to the boundary of the object parcel. Thus, traffic information, such as traffic congestion information, can be sufficiently indicated. Alternatively, in this example, when the CPb represents a highway or when the CPb is extremely away from the boundary of the object parcel, for example, the region defined by the CPa is the processing object. Therefore, in this case, the processing time can be restricted from being too long.

Alternatively, another example is conceived to set the CPa, which is inside the object parcel, as the CP on the end side normally. In this example, the CPb outside the object parcel may be otherwise set as the CP on the end side when the linear distance A is greater than or equal to a predetermined value. In this example, the region defined by the CPa is the processing object normally, thereby to reduce the processing time as much as possible. Alternatively, when the CPa is extremely away from the boundary of the object parcel, for example, the region defined by the CPb is the processing object. Therefore, the road can be searched to the boundary of the object parcel. Thus, it is possible to avoid insufficient traffic information, such as traffic congestion information.

Alternatively, it is conceived as another example to compare the linear distance A with the linear distance B. In this example, the CPa, which is inside the object parcel, is set as the CP on the end side when the linear distance A is smaller than the linear distance B. Otherwise, the CPb, which is outside the object parcel, is set as the CP on the end side when the linear distance B is smaller than the linear distance A. In this example, the CP on the end side is determined according to the linear distances A, B. When the region defined by the CPb is determined to be the processing object, the road can be searched to the boundary of the object parcel. Thus, traffic information, such as traffic congestion information, can be sufficiently indicated. Alternatively, when the region defined by the CPa is otherwise determined to be the processing object, the processing time can be reduced as much as possible.

In both cases, it is advantageous that the processing time for assigning the virtual CP is reduced, and the processing time for recalculation of the attribute caused by the assignation of the virtual CP can be also reduced, compared with the configuration where the virtual CP is assigned.

<4.2.2 Inheritance of Attributes>

At S130 in FIG. 8, accompanied with the determination of the CPs to be the processing object, inheritance of the attributes is also implemented.

Among the CPs as the DLR data, only the CP, which represents an intersection and having the IP flag being set at 1, includes various kinds of attributes. Therefore, the non-shape-relevant attributes of such a CP is inherited to a CP, which exists between intersections. In this way, acquisition of the non-shape-relevant attributes at each time in processings described later can be omitted. Specifically, the attributes to be inherited are the attribute FC, the attribute FW, the attribute RD, the attribute DD, and the attribute AFR.

In the conversion processing described above, the array of CPs converted into intermediate data is generated. That is, at this time, the CPs have the various kinds of attributes shown in FIG. 4. At least one of the node and the link of the map data also has the attributes corresponding to the attributes of the CPs. Therefore, a road represented by the CPs is finally estimated by comparing the various attributes.

<5. Detail of Matching Processing (Second Half)>

Referring to FIG. 3, at S200 of the matching processing, a candidate link search processing is implemented. In the candidate link search processing, a candidate link array is searched, and thereafter narrowing down processing is implemented for each link. At subsequent S300, a candidate selection processing is implemented. The candidate selection processing is implemented further to narrow down the link, which has been narrowed down at S200. At subsequent S400, a road matching processing is implemented. The road matching processing is implemented to estimate a link, which connects CPs therebetween. The processing of S200 to S400 is repeatedly implemented by the number of the object CPs each being narrowed down at S130 in FIG. 8.

As follows, the processing will be described in detail. FIG. 12 shows an example of the candidate link search processing at S200. At S210, information on the object CP is first obtained. The processing is implemented to obtain the category of the CP, the latitude of the CP, and the longitude of the CP. The category of the CP represents distinction among the CP, which represents an intersection, the virtual CP, and other CPs.

Figure 13A:
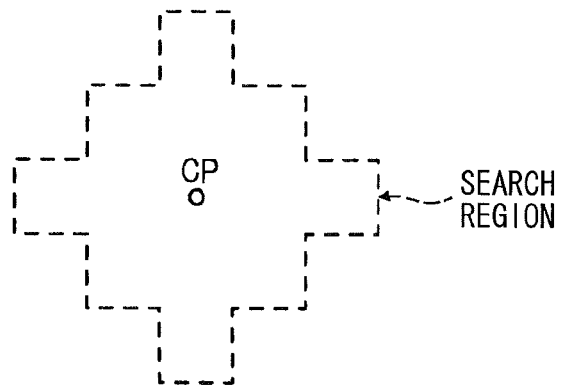
FIGS. 13A, 13B are explanatory views showing a search region for the object CP and retrieval of parcels.

At subsequent S220, a search region is set. The processing is implemented to set the search region of links around the object CP. For example, as shown by the dashed line in FIG. 13A, the search region has the boundary defined by a polygon including a vertical line segment and a horizontal line segment. In the present embodiment, the search region is defined by the region including a square and a cross shape being combined together. The cross shape is longer than one side of the square.

Figure 13B:
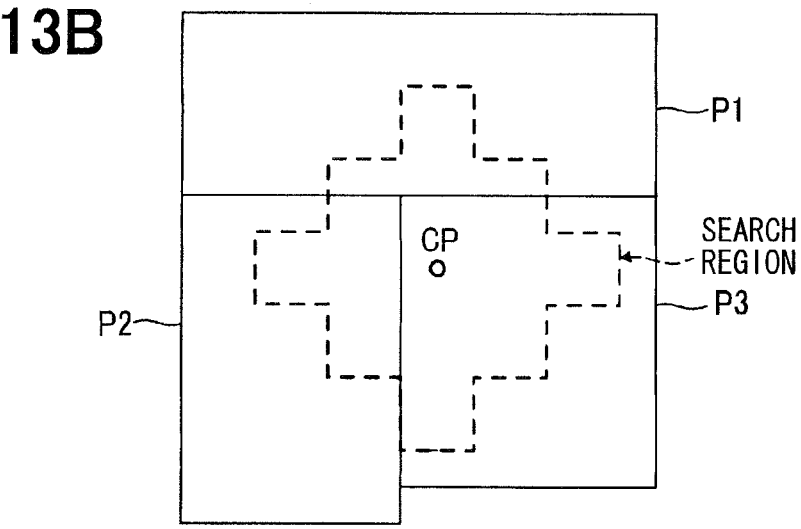

At subsequent S230, a parcel located in the search region is retrieved. This processing is implemented to retrieve all the parcels related to the search region in the selection of the link array, in consideration of that the node and the link are managed by each parcel. For example, as shown in FIG. 13B, the three parcels P1, P2, P3 are retrieved in dependence upon the search region.

At subsequent S240, the link array selection processing is implemented. The link array selection processing is implemented to search links for each link array, according to the non-shape-relevant attributes. The link array is a link group including a series of links having the same road classification, such as a highway or a local road. In this processing, a link array partially included in the parcel retrieved at S230 is a search object. In short, at the present stage, a link array is first narrowed down according to the attributes without determination whether the link array is in the search region.

<5.1 Link-Array Selection Processing>

Figure 14:
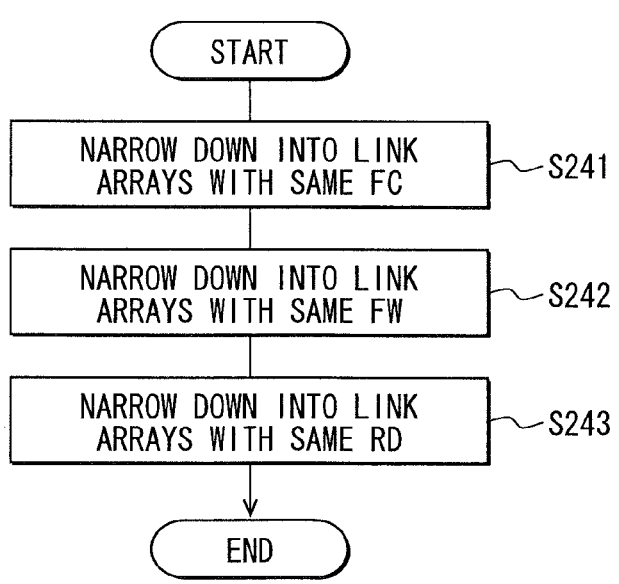
FIG. 14 is a flow chart showing a link array selection processing in the candidate link search processing.

Hereafter, the link-array selection processing will be described in detail. FIG. 14 shows one example of the link-array selection processing. In the link array selection processing, extraction is implemented for each link array according to the attribute FC, the attribute FW, and the attribute RD each being the non-shape-relevant attribute.

At S241, link arrays are narrowed down into link arrays having the same attribute FC. Referring to FIG. 5, the attribute FC represents the road classification, as described above. In this processing, the road classifications assigned to links of a link array are compared with the attribute FC of the object CP to narrow down the link arrays. It is noted that the road classification may change in the course of a link array. In consideration of this, when the road classifications of all the links of a link array coincide with the attribute FC, the link array is determined to be a candidate link array.

At S242, link arrays are narrowed down into link arrays having the same attribute FW. Referring to FIG. 6, the attribute FW represents the physical road type, as described above. In this processing, the physical road types assigned to links of a link array are compared with the attribute FW of the object CP to extract a link array. It is noted that the physical road type may change in the course of a link array. In consideration of this, when the physical road types of all the links of a link array coincide with the attribute FW, the link array is determined to be a candidate link array.

At S243, link arrays are narrowed down into link arrays having the same attribute RD. Referring to FIG. 4, the attribute RD represents the route number or the road name, as described above. In this processing, only when the attribute RD represents the route number, determination of coincidence of the route numbers is implemented. In this case, the route numbers assigned to links of a link array are compared with the attribute RD of the object CP to narrow down link arrays. It is noted that the route number may change in the course of a link array. In consideration of this, when the route numbers of all the links of a link array coincide with the attribute RD, the link array is determined to be a candidate link array.

By implementing the link array selection processing in this way, a link array narrowed down, i.e., extracted according to the non-shape-relevant attribute remains as a candidate link array.

<5.2 Extraction of Link>

At S250 in FIG. 12, a link partially included in the search region centering on, i.e., around the object CP is extracted. The link array is selected in the link array selection processing at S240. Therefore, in this processing, a link partially included in the search region is extracted from the links of the selected link array.

The link partially included in the search region will be described here. The following description is made on the premise that a node is assigned normally to an intersection, a node is assigned to the boundary of a parcel, and a shape-interpolation point is set between nodes as needed.

<5.2.1 Case: Object CP is Intersection>

When the object CP represents an intersection, a node-conscious processing is implemented. The node-conscious processing is implemented, since the object CP is matched with a node when the object CP represents an intersection.

Therefore, in this case, when one of two nodes of a link is included in the search region, the link is determined to be a link partially included in the search region.

Figure 15A:
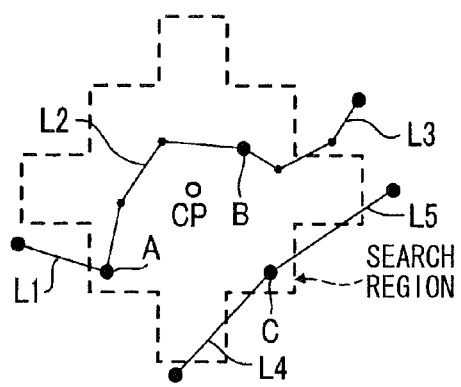
FIGS. 15A, 15B, 15C, 15D are explanatory views showing extraction of a link array in the search region.

For example, it is assumed that the object CP shown in FIG. 15A represents an intersection. In this case, the nodes A, B, C included in the search region are matched with the object CP. Therefore, each of the links L1, L2, L3, L4, L5 having one termination point being one of the nodes A, B, C is the link partially included in the search region.

It is noted that the map data has a level (parcel level) corresponding to its scale size. The parcel level is changed as a user switches the scale size. Therefore, extraction of a link is implemented for all the parcel levels. The parcel level is set sequentially from the lower level in a manner of, for example, LV0 to LV2 to LV4 to LV6 to LV8 to LV10, etc. As the parcel level goes up to the higher level, intersections and roads are reduced.

The CPs are data corresponding to LV0 being the lowest parcel level. Therefore, on the parcel levels higher than LV2, a node corresponding to an intersection does not necessarily exist. In consideration of this, in the extraction processing on the parcel level higher than LV2, even when nodes of a link do not exist in the search region, the link is extracted in a case where the link satisfies a predetermined condition. The case where the link satisfies the predetermined condition will be described later.

<5.2.2 Case: Object CP is Virtual CP>

When the object CP represents a virtual CP, a node-conscious processing is also implemented. The specification of the map data regulates to define a node in a parcel boundary. Therefore, when the object CP is a virtual CP, the virtual CP is assigned in the parcel boundary. In consideration of this, when a node exists in the same parcel boundary, the node is matched with the virtual CP.

Thus, when one of nodes of a link exists in a parcel boundary and when the one node existing in the parcel boundary is included in the search region, the link is determined to be the link partially included in the search region.

Figure 15B:
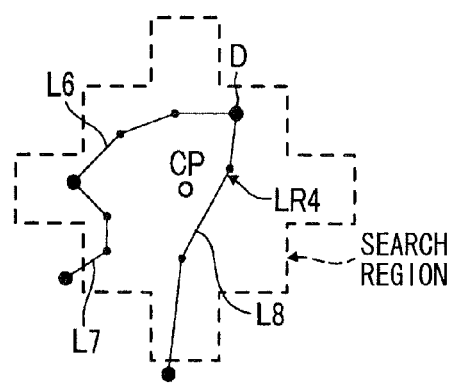

For example, as shown in FIG. 15B, it is supposed that the object CP represents the virtual CP, and the node D exists in the parcel boundary. In this case, the links L6, L8 having the node D as one termination point are the links partially included in the search region.

<5.2.3 Case: Object CP is Neither Intersection Nor Virtual CP>

In this case, it is unknown whether the object CP can be matched with a node. Therefore, a link is extracted without being conscious of a node. In short, in the case where the object CP is neither an intersection nor a virtual CP, a link, in which at least one of nodes is included in the search region, and a link, in which none of nodes is included in the search region, are extracted in a case where the link satisfies a predetermined condition. In this case, the extraction of a link is implemented in a similar manner on all the parcel levels.

<5.2.4 Case Where Link Satisfies Predetermined Condition>

Figure 15C:
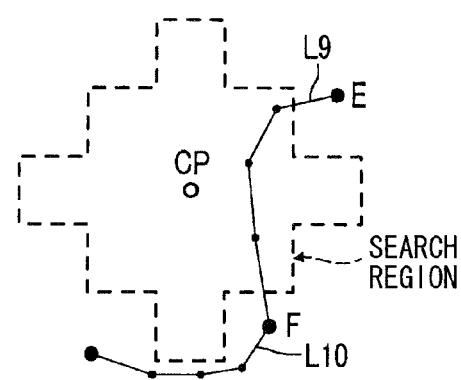
Figure 15D:
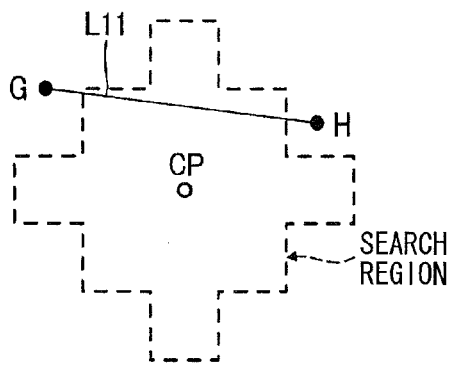

In the following two cases, the link satisfies the predetermined condition. In one of the two cases, shape-interpolation points are set between the two nodes, and a line segment connecting the shape-interpolation points is partially included in the search region. For example, as shown in FIG. 15C, a link L9 includes a line segment, which connects the shape-interpolation points (small black dots), and the line segment of the link L9 is partially included in the search region. Therefore, although the nodes E, F are not included in the search region, the link L9 is the link partially included in the search region. On the other hand, the link L10 includes a line segment, which connects the shape-interpolation points, and the line segment of the link L10 is not partially included in the search region. Therefore, the link L10 is not the link partially included in the search region. In the other of the two cases, a shape-interpolation point is not set between the two nodes, and a line segment connecting the two nodes is partially included in the search region. For example, as shown in FIG. 15D, a link L11 includes two nodes G, H connected by a line segment, and the line segment is partially included in the search region. Therefore, the link L11 is the link partially included in the search region.

<5.2.5 Others>

Referring to FIG. 12, at subsequent S260, links partially included in the search region are narrowed down into a link having the attribute RD being coincident. When the attribute RD represents a route number, the determination is made at S243 in FIG. 14. Therefore, in this processing, coincidence is determined according to a road name when the attribute RD represents the road name. It is regulated that the road name includes five characters at maximum. Therefore, it is determined whether the character string being the value of the attribute RD is included in the road name assigned to the link.

At S270, ten links at maximum are extracted. Specifically, when the number of links is more than ten after the narrowing down at S260, ten links are selected sequentially from one link near the object CP. Specifically, for example, a perpendicular line may be drawn from the object CP to each link to measure the distance between the object CP and each link, and thereby it is determined whether the link is near the object CP.

<5.3 Candidate Selection Processing>

Figure 16:
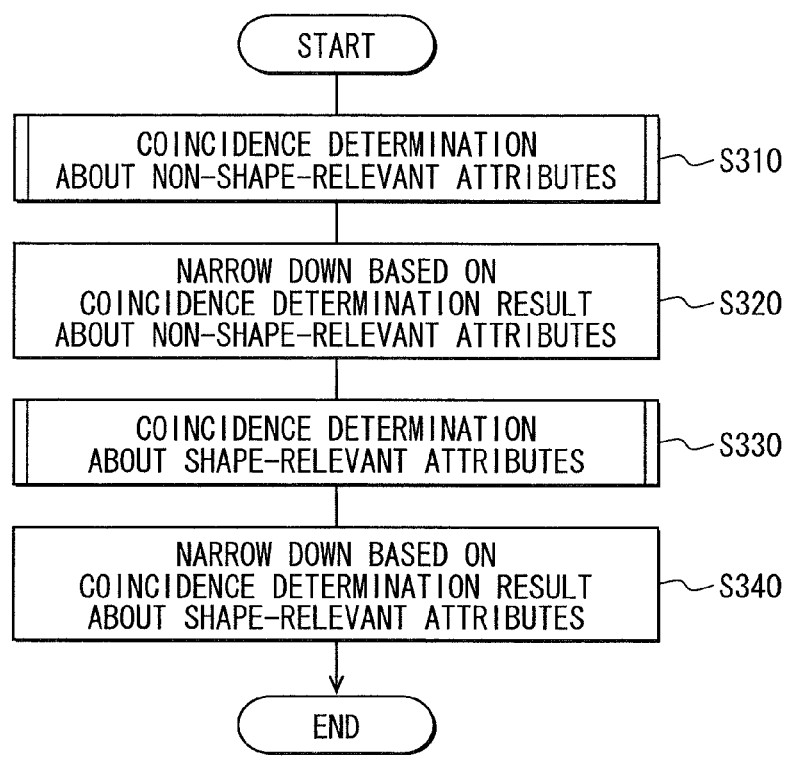
FIG. 16 is a flow chart showing a candidate selection processing in the matching processing.

Subsequently, the candidate selection processing at S300 in FIG. 3 will be described. The candidate selection processing is implemented to select a candidate for each of links and nodes. FIG. 16 shows one example of the candidate selection processing.

At S310, coincidence determination is implemented according to non-shape-relevant attributes. In this processing, the coincidence determination is implemented for the link extracted at S200 and/or the nodes of the extracted link according to the attribute FC, the attribute FW, the attribute IT, the attribute RDI, the attribute DD, and the attribute AFR. Details of the coincidence determination processing will be described later in detail. The attribute FC and the attribute FW are already used in the narrowing down processing of the link array at S241, S242 in FIG. 14. Therefore, this processing may include a redundant processing. Nevertheless, the narrowing down processing is again implemented in order to make sure the narrowing down processing. This coincidence determination is implemented further by using the attribute IT, the attribute RDI, the attribute DD, the attribute AFR, and the like in order to implement a finer coincidence determination processing to surely retrieve a correct result.

At subsequent S320, a candidate link is narrowed down, i.e., extracted based on the determination result according to the non-shape-relevant attributes. Specifically, as a result of the coincidence determination according to the non-shape-relevant attributes at S310, a link having many coincident attributes is determined to be a candidate link.

At subsequent S310, coincidence determination is implemented according to shape-relevant attributes. In this processing, the coincidence determination is implemented for the candidate link determined at S320 and/or the nodes of the determined link according to the attribute BR, the attribute PCI, the attribute CA, and the attribute DCA. Details of the coincidence determination processing will be described later in detail.

At subsequent S340, a candidate link is further narrowed down, i.e., extracted based on the determination result according to the shape-relevant attributes. Specifically, as a result of the coincidence determination according to the shape-relevant attributes at S330, a link having many coincident attributes is determined to be a candidate link.

<5.3.1 Coincidence Determination According to Non-Shape-Relevant Attribute>

Figure 17:
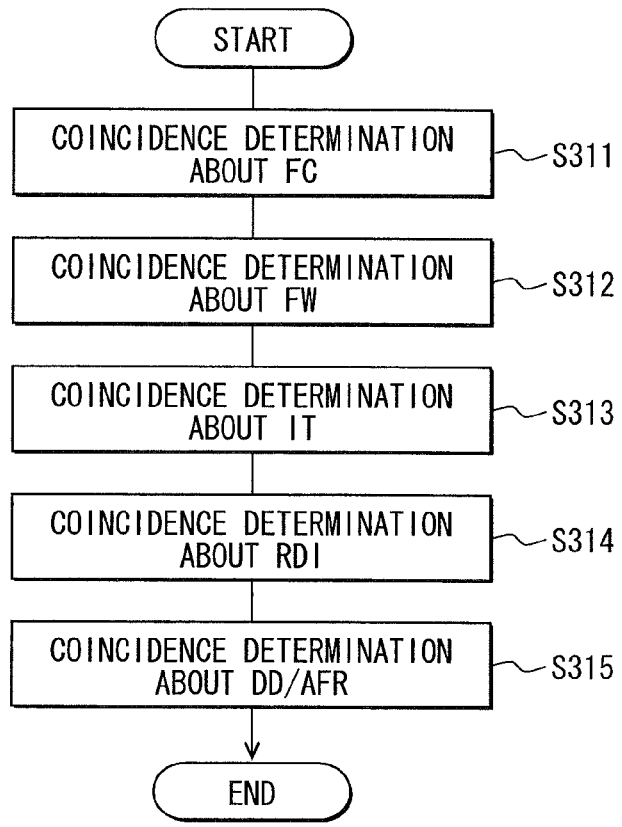
FIG. 17 is a flow chart showing a coincidence determination processing according to non-shape-relevant attributes in the candidate selection processing.

As follows, the coincidence determination according to non-shape-relevant attributes at S310 will be described in detail. FIG. 17 shows one example of the coincidence determination according to the non-shape-relevant attributes.

At S311, coincidence determination is implemented according to the attribute FC. Referring to FIG. 5, the attribute FC represents the road classification, as described above. In this processing, coincidence is determined between the road classification assigned to a link being a determination object and the attribute FC of the object CP.

At subsequent S312, coincidence determination is implemented according to the attribute FW. Referring to FIG. 6, the attribute FW represents the physical road type, as described above. In this processing, coincidence is determined between the physical road type assigned to a link being a determination object and the attribute FW of the object CP.

At subsequent S313, coincidence determination is implemented according to the attribute IT. Referring to FIG. 7, the attribute IT represents the classification of an intersection, as described above. Therefore, only when the object CP represents an intersection, the coincidence determination is implemented.

At least one of the nodes and the links has an attribute equivalent to the attribute IT. In consideration of this, when a node has intersection classification information, which represents the classification of an intersection, coincidence is determined between the intersection classification information on the node corresponding to the object CP and the attribute IT of the object CP. Further, when a link has intersection classification information, which represents the classification of an intersection, coincidence is determined between the intersection classification information on the link connecting to a node, which corresponds to the object CP, and the attribute IT of the object CP. In the latter case, the link may have the intersection classification information on two nodes. Therefore, in this case, coincidence is determined between the intersection classification information on one of the nodes and the attribute IT.

At subsequent S314, coincidence determination is implemented according to the attribute RDI. In FIG. 4, the attribute RDI represents the name of an intersection, as described above. Therefore, only when the object CP represents an intersection, the coincidence determination is implemented. In this processing, coincidence is determined between the intersection name of a node corresponding to the object CP and the attribute RDI of the object CP. This processing is implemented by determining whether the character string, which is the value of the attribute RDI, is included in the intersection name.

At subsequent S315, coincidence determination is implemented according to the attribute DD and the attribute AFR. Referring to FIG. 4, the attribute DD represents a legally-permitted driving direction, and the attribute AFR is a flag, which represents whether the attribute DD is referable. In this processing, the determination is made by comparing the attribute DD of the object CP with an attribute (one-way traffic code) of the link being the determination object. The determination is implemented when the attribute AFR is set at 1 to represent that the attribute DD is valid, excluding a case where the attribute DD is 0 (undefined). It is noted that the attribute DD represents the drivable direction of the road with respect to certain traffic information. Therefore, based on the comparison between the attribute DD and the one-way traffic code of the link, determination of the forward/backward direction of both the items cannot be made. Therefore, in this processing, only the determination whether the road is a one-way traffic road or a two-way traffic road is implemented, and determination of coincidence of the passing direction (drivable direction) is not implemented.

<5.3.2 Coincidence Determination According to Shape-Relevant Attribute>

Figure 18:
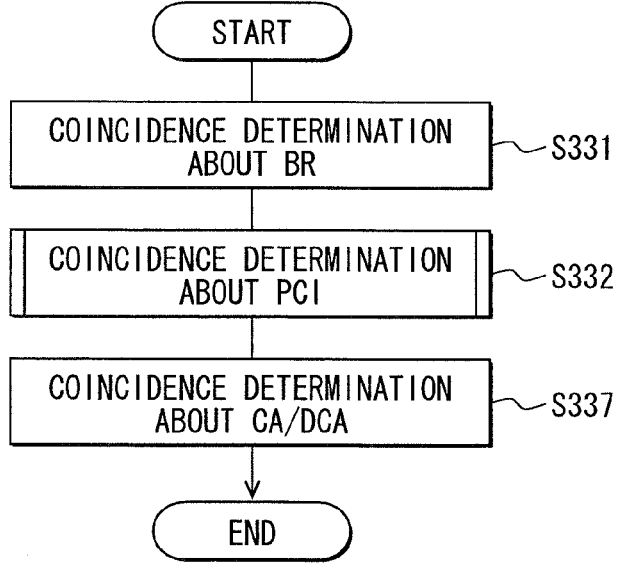
FIG. 18 is a flow chart showing a coincidence determination processing according to shape-relevant attributes in the candidate selection processing.

As follows, the coincidence determination according to the shape-relevant attributes at S330 will be described in detail. FIG. 18 shows one example of the coincidence determination processing according to the shape-relevant attributes.

At S331, coincidence determination is implemented according to the attribute BR. In FIG. 4, the attribute BR represents the geographical angle to the subsequent CP, as described above. A link has an attribute representing the traveling direction legally regulated by law. In consideration of this, non-coincidence determination is implemented in this processing when the traveling direction of the link largely differs from the direction represented by the attribute BR of the object CP. For example, it is conceived to make non-coincidence determination when the angle between the vector, which represents the traveling direction of the link, and the vector, which is directed to the subsequent CP and represented by the attribute BR, is greater than or equal to a predetermined angle, such as 90 degrees. When the link is a two-way traffic road to allow two-way traveling in both traveling directions, the determination is made based on two vectors each representing the traveling direction.

Figure 19A:
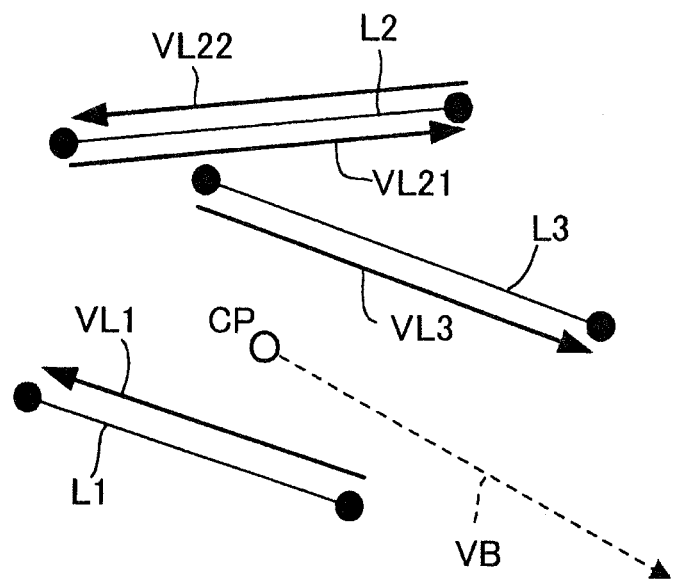
FIGS. 19A, 19B are explanatory views showing a coincidence determination processing according to an attribute BR.

For example, in the example of FIG. 19A, the determination is made based on the angle between the vectors VL1, VL21, VL22, VL3, which respectively represent the traveling directions of the links L1, L2, L3, and the vector VB represented by the attribute BR. In this case, when the angle between both the vectors is greater than or equal to 90 degrees, the non-coincidence determination is made. Specifically, when the angle between the vector VL1 and the vector VB is greater than or equal to 90 degrees, the non-coincidence determination is made. Determinations for the vectors VL21, VL22, VL3 are made, similarly to the determination for the vector VL1. The link L2 is a two-way traffic road to allow two-way traveling in both traveling directions. Therefore, the determination for the link L2 is made based on the two vectors VL21, VL22 representing the traveling directions.

In this example of FIG. 19, the angle between the vector VB and the vector VL1 is approximately 180 degrees and is greater than or equal to 90 degrees. Therefore, non-coincidence determination is made for the link L1. The angle between the vector VL22 of the link L2 and the vector VB is greater than or equal to 90 degrees. Nevertheless, the angle between the vector VL21 of the link L2 and the vector VB is less than 90 degrees. Therefore, coincidence determination is made for the link L2. The angle between the vector VL3 of the link L3 and the vector VB is less than 90 degrees. Therefore, coincidence determination is made for the link L3.

Figure 19B:
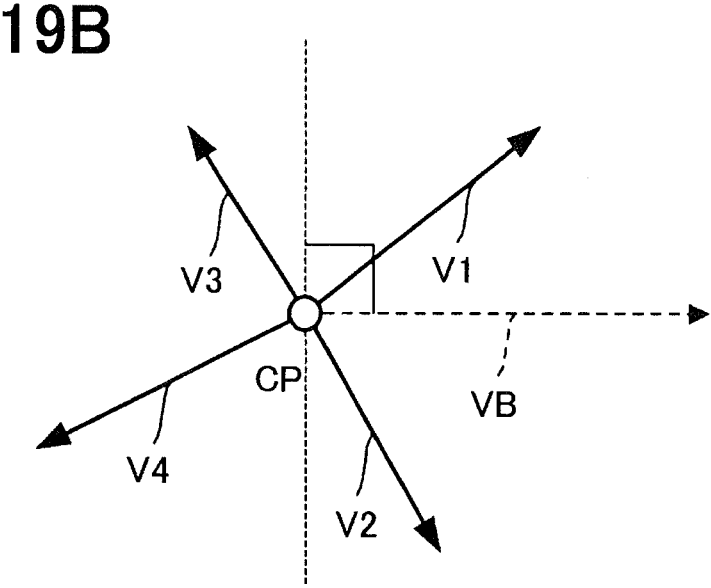

In this example, the non-coincidence determination is made when the angle is greater than or equal to 90 degrees. Therefore, as shown in FIG. 19B, with respect to the vector VB represented by the attribute BR, the coincidence determination is made for the traveling directions of the links represented by the vectors V1, V2, and the non-coincidence determination is made for the traveling directions of the links represented by the vectors V3, V4.

At S332 in FIG. 18, coincidence determination processing is implemented according to the attribute PCI. In FIG. 4, the attribute PCI represents one of driveways being selected when multiple driveways exist in the same direction, as described above.

The attribute PCI includes the number of driveways and the sequence number representing the road in the driveways. It is noted that when coincidence determination processing is implemented based on the attribute PCI, all links directed in parallel need to be identified.

Figure 20:
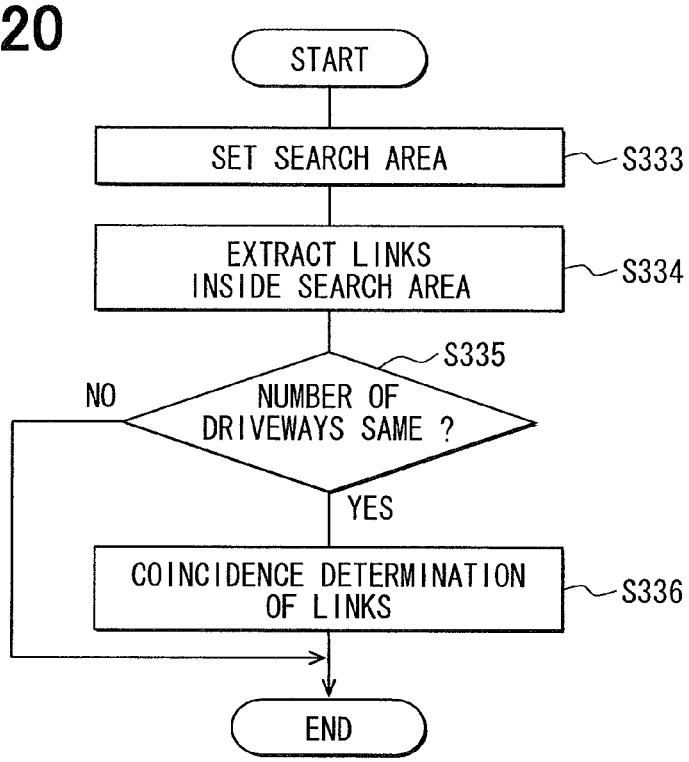
FIG. 20 is a flow chart showing a coincidence determination processing according to the attribute PCI in the coincidence determination processing according to the shape-relevant attributes.

In consideration of this, at S333 in FIG. 20, a search area around the object CP is set. It is conceivable to set the search area to be the inside of the circle centering on the object CP. More specifically, for example, the search area may be set within a circle centering on the object CP and having a predetermined radius such as 150 meters. It is noted that a default value of the search area may be assigned as one value of the PCI attribute. In this case, it is conceivable to set the search area within a circle centering on the object CP and having a radius being a summation of a predetermined distance such as 150 meters and the default value.

At subsequent S334, links in the search area are extracted. The attribute PCI includes an indicator type as one attribute. Therefore, in this processing, a virtual straight line is drawn in the direction along the latitude or in the direction along the longitude according to the indicator type, thereby to extract links intersecting to the virtual straight line At subsequent S335, it is determined whether the number of the extracted links coincides with the number of the driveways. When it is determined that the number of the extracted links coincides with the number of the driveways (S335: YES), at S336, the links are identified based on the sequence number. Further, it is determined whether the identified links coincide with links of the determination object. Thus, the coincidence determination according to the attribute PCI is terminated. Otherwise, when the number of the extracted links does not coincide with the number of the driveways (S335: NO), the processing at S336 is not implemented, and the coincidence determination processing according to the attribute PCI is terminated. In this case, the processing at S336 is omitted, since wrong determination may be made when the number of the extracted links does not coincide with the number of the driveways.

Figure 21A:
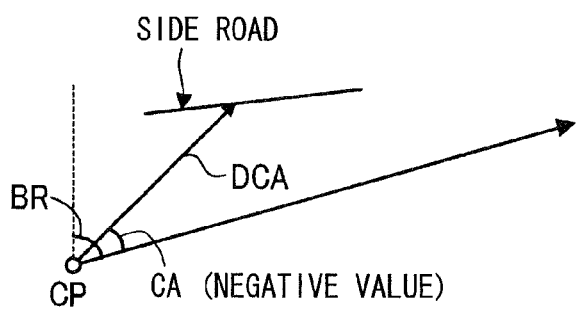
FIGS. 21A, 21B are explanatory views showing a coincidence determination processing according to an attribute CA and an attribute DCA.
Figure 21B:
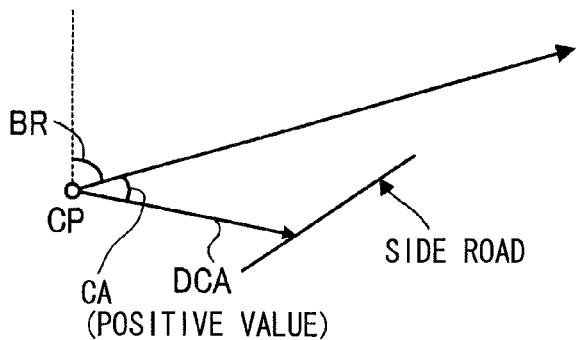

Referring to FIG. 18, at S337, coincidence determination is made according to the attribute CA and the attribute DCA. Referring to FIG. 4, the attribute CA represents the angle relative to a side road, and the attribute DCA represents the connection distance to the side road. In this processing, the direction to the side road is first detected. Specifically, as shown in FIG. 21A, when the attribute CA is a negative value, it is determined that the side road is located on the left side relative to the direction, which is represented by the attribute BR and directed to the subsequent CP. Otherwise, as shown in FIG. 21B, when the attribute CA is a positive value, it is determined that the side road is located on the right side relative to the direction, which is represented by the attribute BR and directed to the subsequent CP. When the attribute CA is 0, the direction of the side road cannot be identified. Therefore, in this case, the coincidence determination processing is not implemented. Subsequently, coincidence determination about the attribute CA and the attribute DCA is implemented based on the physical relationship between the link of the determination object and the side road of the link.

In the candidate selection processing of S300 as described above, the links being the candidates are selected around each CP. The road matching processing (S400) in FIG. 3 is implemented in order to estimate a link, which connects these links, i.e., to implement a link, which connects CPs therebetween.

<5.4 Road Matching Processing>

Figure 22:
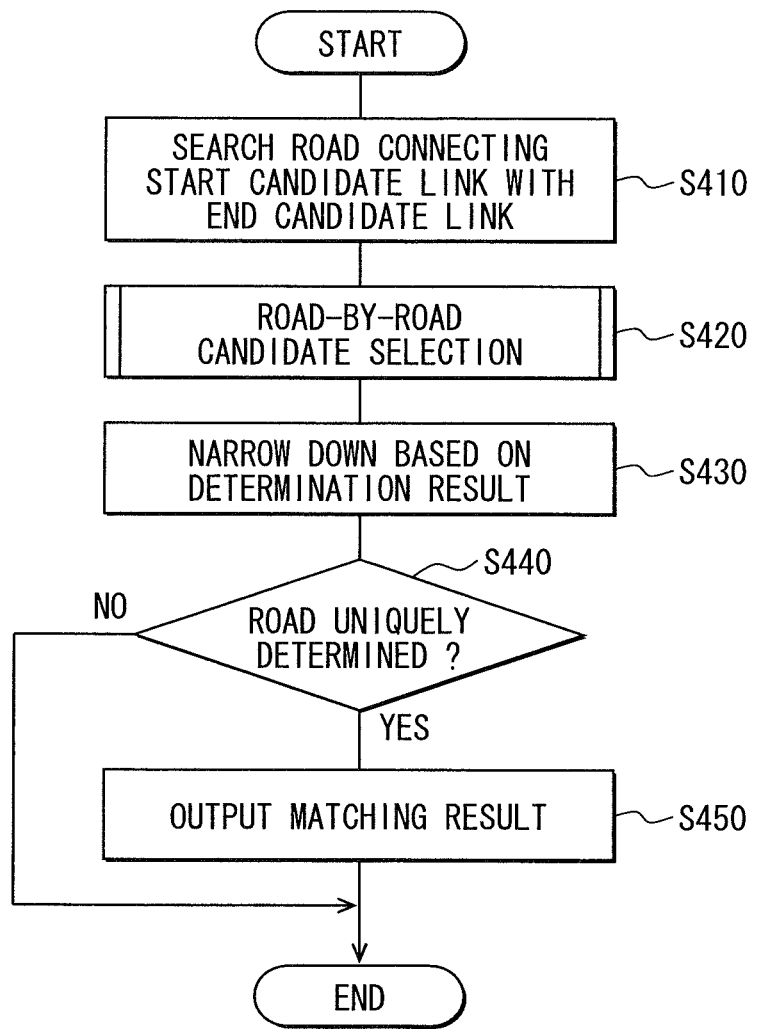
FIG. 22 is a flow chart showing a road matching processing in the matching processing.

Next, the road matching processing at S400 will be described. FIG. 22 shows one example of the road matching processing. In the road matching processing, two CPs are defined as object CPs. Further, the CP on the start side of the two CPs is a start-side CP, and the CP on the end side of the two CPs is an end-side CP.

<5.4.1 Road Search>

Figure 23A:
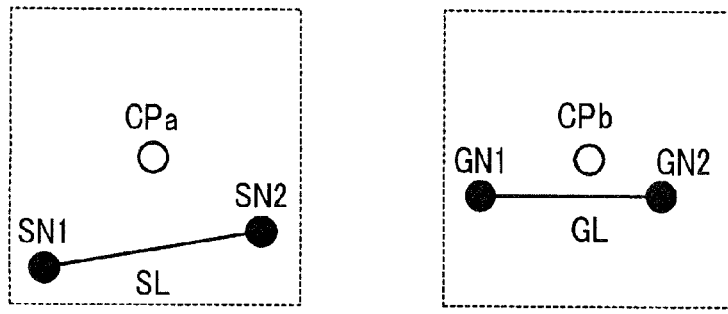
FIGS. 23A, 23B, 23C, 23D are explanatory views showing omission methods for the road search processing.

At S410, a search processing is implemented to search a road, which connects a start-side candidate link with an end-side candidate link. The start-side candidate link is a link extracted for the start-side CP. The end-side candidate link is a link extracted for the end-side CP. In this processing, all the roads, each of which connects the start-side candidate link with the end-side candidate link, are searched. In one example shown in FIG. 23A, the start-side CP is a CPa, the end-side CP is a CPb, the extracted link for the CPa is SL, and the extracted link for the CPb is GL. In this case, the search processing is implemented to search a road connecting the start-side candidate link SL with the end-side candidate link GL. It is noted that the search processing searches the road for all the combinations between any one of the two nodes SN1, SN2 of the link SL and any one of the two nodes GN1, GN2 of the link GL. More specifically, the processing searches the road connecting the SN1 with the GN1 in this order, the road connecting the SN1 with the GN2 in this order, the road connecting the SN2 with the GN1 in this order, and the road connecting the SN2 with the GN2 in this order.

At subsequent S420, a road-by-road candidate selection is implemented. This processing is implemented to determine a candidate road among the roads searched at S410 based on various kinds of shape-relevant attributes. At subsequent S430, a candidate road is narrowed down based on the determination result at S420.

At the subsequent S440, it is determined whether a road is uniquely determined. When a road is uniquely determined (S440: YES), a matching result is outputted at S450, and thereafter, the road matching processing is terminated. Otherwise, when a road is not uniquely determined (S440: NO), the processing at S450 is not implemented, and the road matching processing is terminated.

<5.4.2 Omission of Road Search>

In this way, the road matching processing (S410 to S440) is repeated for the two object CPs being paired. It is noted that at S410, a road to be searched using the result of the road matching processing may be omitted.

Figure 23B:
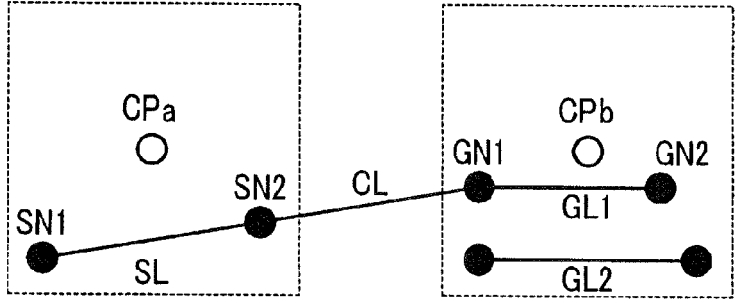

For example, as shown in FIG. 23B, it is supposed that a road from the link SL through the link CL to the link GL1 is uniquely determined, as a result of the road matching processing between the CPa and the CPb. In this case, when the road matching processing is implemented to search a road from the CPb to the subsequent CP, a road connected from the link GL1 is searched. That is, even when the link GL2 exists in the candidate links, the road search processing starting from the link GL2 is omitted.

Figure 23C:
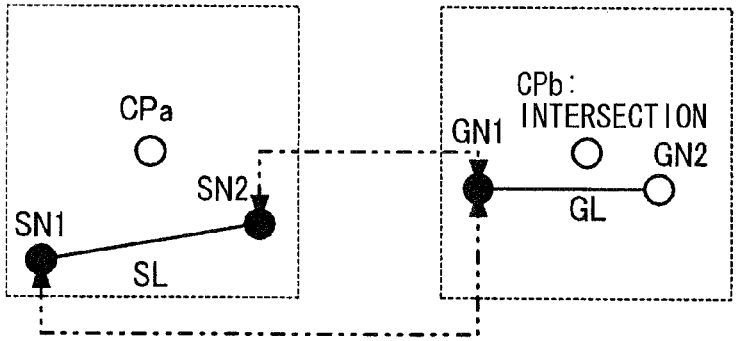

In addition, the road search processing is omitted according to the category of the CP. Specifically, for example, as shown in FIG. 23C, when the CPb is an intersection, the CPb coincides with the node GN2, which represents an intersection. Therefore, in this case, the road search processing is implemented for the link GL to search a road connected to the one node GN1 of the link GL. That is, the processing searches a road connecting the node SN1 with the node GN1 and a road connecting the node SN2 with the node GN1.

Figure 23D:
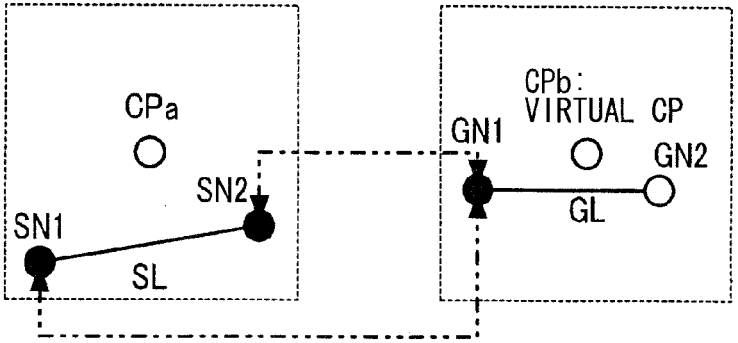

As shown in FIG. 23D, when the CPb is a virtual CP and when the node GN2 is located in the boundary of the object parcel, the node is the start-side node or the end-side node. In consideration of this, a road connected to one node GN1 is searched for the link GL, similarly to the previous case. That is, the processing searches a road connecting the node SN1 with the node GN1 and a road connecting the node SN2 with the node GN1.

Figure 24A:
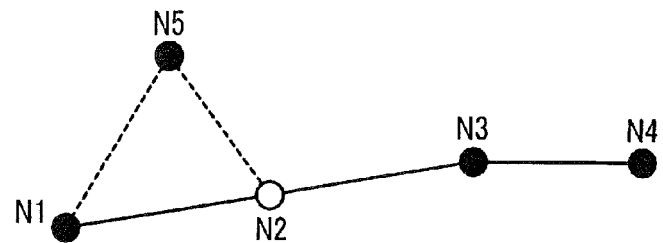
FIGS. 24A, 24B, 24C are explanatory views showing omission methods for the road search processing.

It is further conceived not to again search a road, which is once searched, thereby to reduce a required time for the road search processing. For example, as shown by the solid line in FIG. 24A, it is supposed that the search processing is first implemented and has searched a road starting from the node N1 through the nodes N2 and N3 to the node N4 in this order. In this case, when the road search processing is second implemented from the node N1, the road search processing is implemented to search a road starting from the node N1 through the node N5 to the N2. It is noted that, the road search processing for searching a road from the node N2 has been already implemented. Therefore, the road search processing for searching a road starting from the node N2 is not implemented at this time.

Figure 24B:
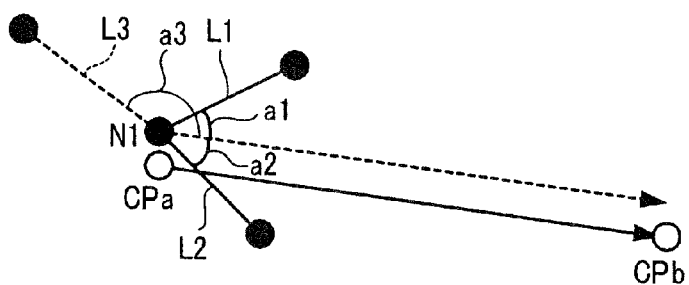

In addition, when a link branches from a node, a priority is assigned to the link, and the road search processing is implemented. For example, when the road search processing is implemented from a certain node, a reference direction in which the certain node is connected with the object CP is calculated. Subsequently, an angle between each of links, which is connected with the certain node, and the reference direction is calculated. Thus, only links within a predetermined angle are set as objects in the road search processing. In the example shown in FIG. 24B, the road search processing is implemented to search a road starting from the node N1. In his case, the reference direction is set at the direction from the CPa to the CPb. Further, the angles a1, a2, a3 of the links N1, L2, L3 each connected with the node N1 are calculated relative to the reference direction. In the present example, the angles a1, a2 are within the predetermined angle, and therefore, the links L1, L2 are set as the objects of the road search processing. In addition, the angle a3 is out of the predetermined angle, and therefore, the link L3 is excluded from the object of the road search processing.

Figure 24C:
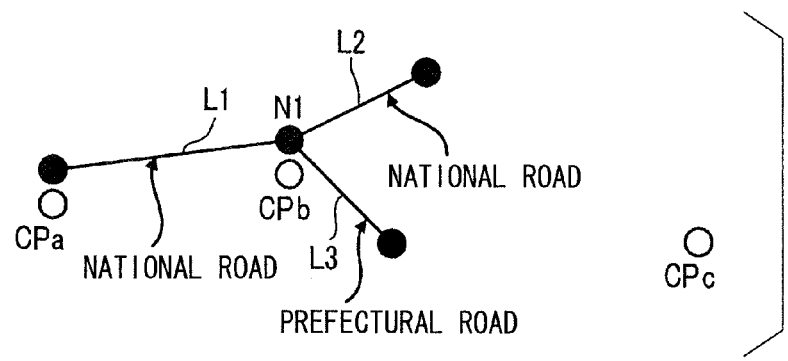

Furthermore, when the search processing is implemented from a certain node, a link, which has the road classification being the same as the road classification of the link to certain the node, is set as the object of the road search processing. In the example shown in FIG. 24C, a road, which starts from the CPb to the CPc, is searched from the node N1. In this case, it is assumed that the road between the CPa to the CPb has been determined as the link L1. At this time, the road classification of the link L1 represents a national road. Therefore, in the road search from the node N1, the link L2, which has the road classification representing a national road, is set as the object of the road search. That is, the link L3, which has the road classification representing a prefectural road, is excluded from the object of the road search.

<5.4.3 Stop of Road Search>

The road search processing at S410 is not necessarily completed within a predetermined time. In consideration of this, the road search processing may be aborted in the course of the processing.

Figure 25A:
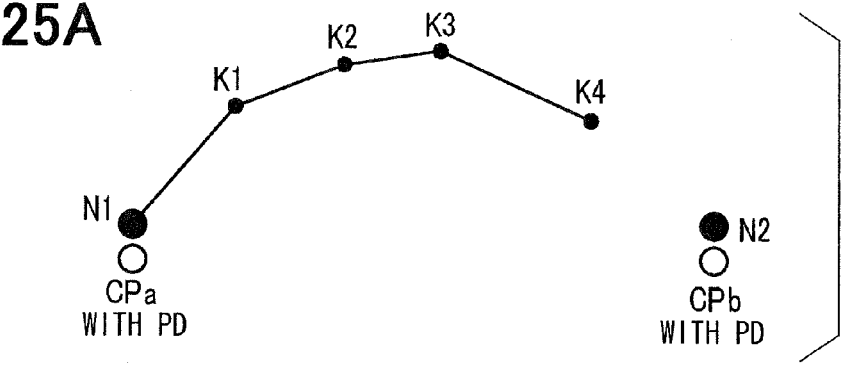
FIGS. 25A, 25B, 25C, 25D are explanatory views showing stop methods for the road search processing.

For example, it is conceivable to use the attribute PD. In the example shown in FIG. 25A, it is supposed that both the CPa and the CPb respectively have the attributes PD. In this case, when a road is searched from the node N1 to the node N2, the accumulation distance is calculated along the shape-interpolation points K1, K2, K3, K4. When the accumulation distance becomes greater than or equal to the value of the attribute PD by the certain value, the road search processing is stopped.

Figure 25B:
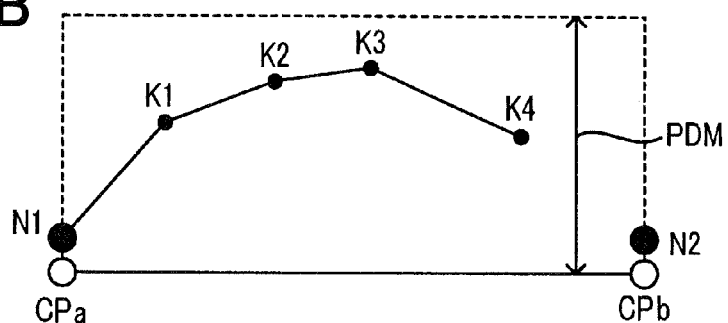

Alternatively, for example, it is conceivable to use the attribute PDM. Specifically, as shown in FIG. 25B, the distance along the U-shaped path shown by the dashed line is calculated by using the linear distance between the CPa and the CPb and the value of the attribute PDM. In this case, when a road is searched from the node N1 to the node N2, the accumulation distance is calculated along the shape-interpolation points K1, K2, K3, K4. When the accumulation distance becomes greater than or equal to the distance along the U-shaped path shown by the dashed line by the certain value, the road search is stopped.

Figure 25C:
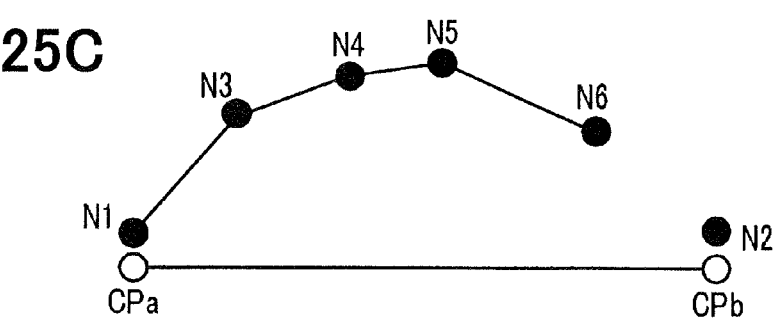

Alternatively, for example, it is conceivable to use the number of the nodes to be passed. Specifically, in the example shown in FIG. 25C, when the road search processing is implemented to search a road starting from the node N1 to the node N2, the number of the nodes N3, N4, N5, N6 being passed therethrough is counted. When the counted number of the nodes becomes greater than the certain value, the road search processing is stopped.

Figure 25D:
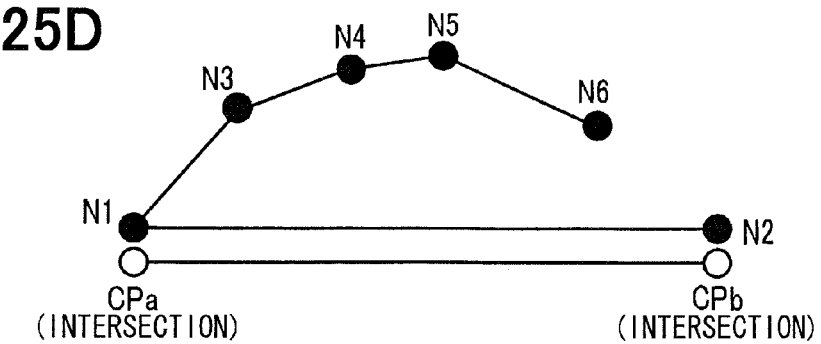

Alternatively, for example, it is conceivable to use that a CP is an intersection. In the example shown in FIG. 25D, it is supposed that both the CPa and the CPb are respectively intersections. In this case, when both the node N1 and the node N2 are respectively intersections, the node N1 and the node N2 respectively coincide with the CPa and the CPb. Therefore, the linear distance between the node N1 and the node N2 is calculated beforehand. When a road starting from the node N1 to the node N2 is searched, the accumulation distance of the path passing through the nodes N3, N4, N5, N6 is calculated. Thus, in this case, when the accumulation distance becomes greater that or equal to the linear distance between the node N1 and the node N2, which is calculated beforehand, by the certain value, the road search processing is stopped.

In any of the four methods as described above, the road search processing is stopped in the course of the processing when determined to be wrong. Therefore, the processing load for the road search processing is reduced.

<5.4.4 Road-by-Road Candidate Selection>

Figure 26:
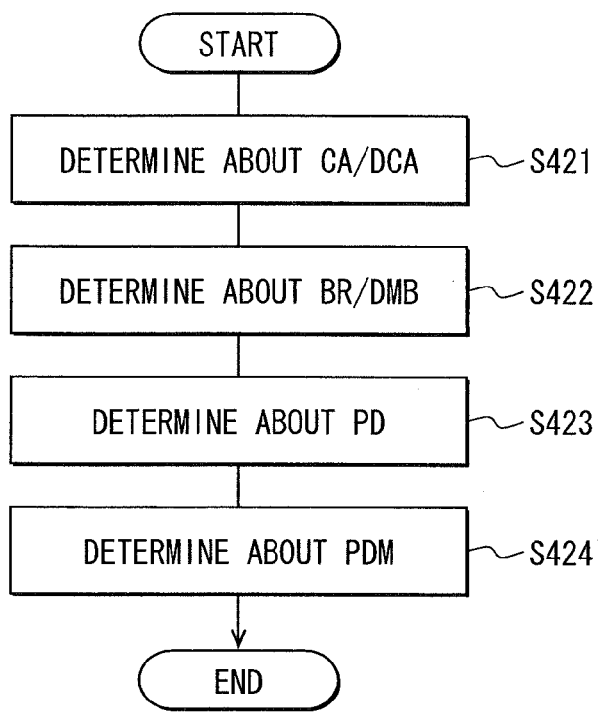
FIG. 26 is a flow chart showing a road-by-road candidate selection processing in the road matching processing.

As follows, the road-by-road candidate selection processing in FIG. 22 will be described. FIG. 26 shows one example of the road-by-road candidate selection processing. The road-by-road candidate selection processing is implemented to make determination of "OK" or "NG" road by road (per road unit) for the roads extracted between the CPs.

Figure 27A:
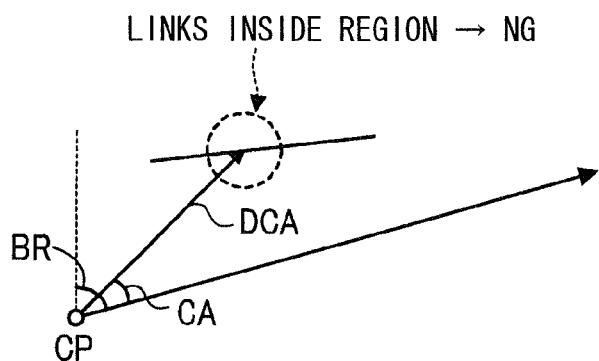
FIGS. 27A, 27B are explanatory views showing a road selection processing according to the attribute CA and the attribute DCA.
Figure 27B:
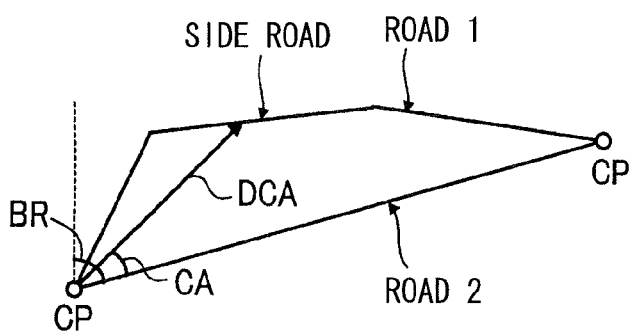

At S421, determination is implemented according to the attributes CA, DCA. Referring to FIG. 4, the attribute CA represents the angle relative to a side road, and the attribute DCA represents the connection distance to the side road, as described above. In this processing, it is determined whether a link of the searched roads is a side road based on the attribute CA and the attribute DCA. On determination of a side road, an NG determination is made to the link. Specifically, as shown by the dashed line in FIG. 27A, when the circumference of coordinates represented by the attribute CA and the attribute DCA includes a link, an NG determination is made to a road including the link. For example, FIG. 27B shows a road 1 and a road 2 connecting the CPs therebetween. In this example, a link is determined to be a side road based on the attribute CA and the attribute DCA. Therefore, an NG determination is made to the road 1 including the link determined to be a side road.

Figure 28:
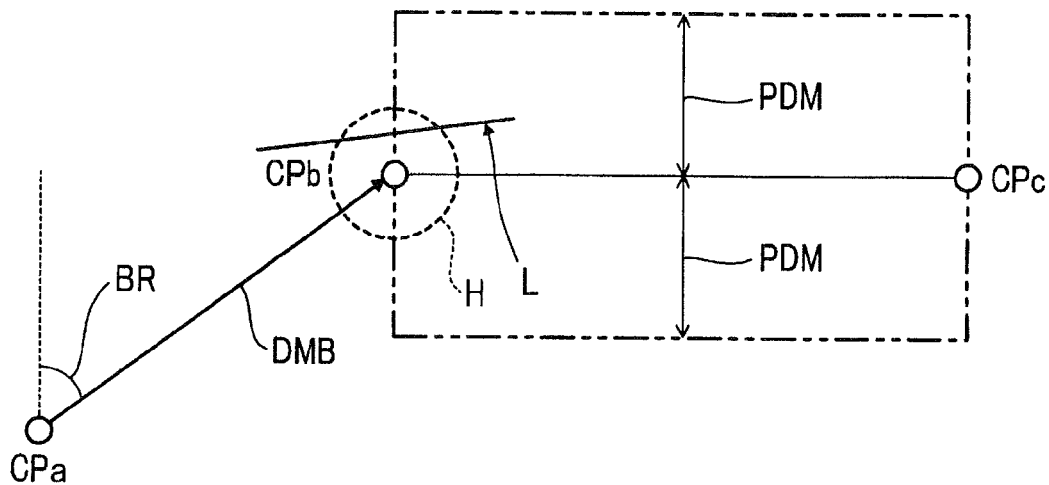
FIG. 28 is an explanatory view showing a road selection processing according to the attribute BR and an attribute DMB.

At S422 in FIG. 26, determination is implemented according to the attributes BR, DMB. In FIG. 4, the attribute BR represents the angle to the subsequent CP, and the attribute DMB represents the linear distance to the subsequent CP, as described above. When deviation exists between data represented by the attribute CP and the map data of the navigation device 10, a road being further possible can be identified by using the attribute BR and the attribute DMB. In consideration of this, as shown in FIG. 28, determination of the road between the CPb and the CPc is implemented by using the attribute BR and the attribute DMB of the CPa in advance of the CPb. Specifically, an OK determination is made to the road including the link L around the coordinates identified by the attribute BR and the attribute DMB. In this case, the link L overlaps the region H shown by the dashed line around the coordinates. The determination is implemented for a road between the CPb and the CPc. Therefore, the determination is made on condition that a node of the link L or a shape-interpolation point of the link L is in the predetermined region. For example, it is conceivable to define the predetermined region in the rectangle area shown by the two-dot chain line in FIG. 28 according to the line segment, which connects the CPb with the CPc, and the attribute PDM. The predetermined region is not limited to the rectangle area and may be defined in an ellipse, which passes the CPb and the CPc.

At subsequent S423, determination is implemented according to the attribute PD. In FIG. 4, the attribute PD is the travel distance to the subsequent CP having the attribute PD, as described above. Therefore, it is determined whether a searched road is a candidate according to the travel distance of the searched road.

Figure 29:
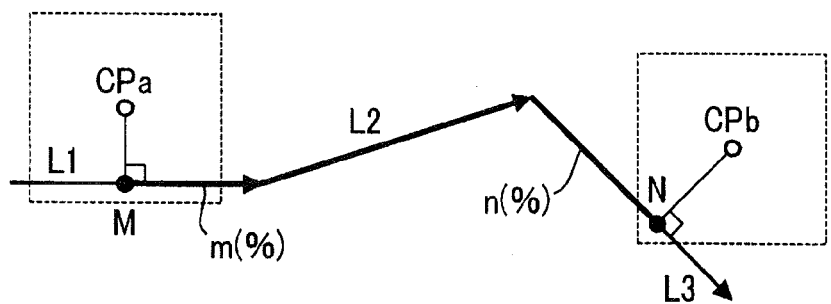
FIG. 29 is an explanatory view showing calculation of a road length according to an attribute PD.

Specifically, in the example shown in FIG. 29, the travel distance between the CPa and the CPb is calculated. In this case, each of the CPs does not necessarily coincide with a node. Therefore, a perpendicular line is drawn from the CPa to the link L1, and the intersection M is set between the perpendicular line and the link L1. In addition, a perpendicular line is further drawn from the CPb to the link L3, and the intersection N is set between the perpendicular line and the link L3. Thus, the travel distance from the intersection M to the intersection N is calculated.

The travel distance from the intersection M to the next node is obtained by calculating a rate (percentage) of the travel distance relative to the link L1. Specifically, in the case where the distance from the intersection M to the next node is m percent (%) of the link L1, the travel distance of the link L1 is multiplied by (m/100) to calculate the travel distance from the intersection M to the next node.

Similarly, the travel distance from the intersection N to the preceding node is obtained by calculating a rate (percentage) of the travel distance relative to the link L3. Specifically, in the case where the distance from the intersection N to the preceding node is n percent (%) of the link L3, the travel distance of the link L3 is multiplied by (n/100) to calculate the travel distance from the intersection N to the preceding node.

Figure 30A:
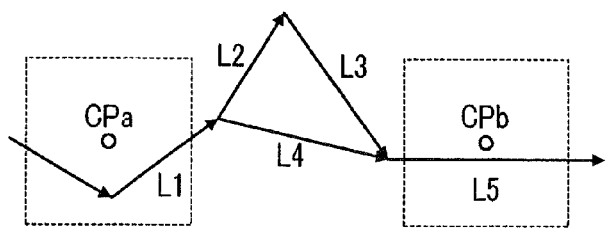
FIGS. 30A, 30B, 30C are explanatory views showing a road selection processing according to the attribute PD.
Figure 30B:
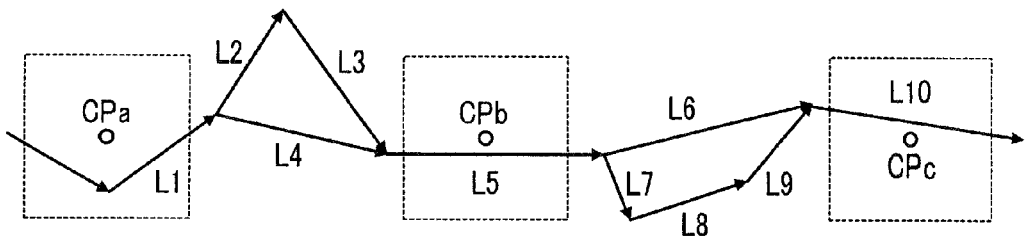
Figure 30C:
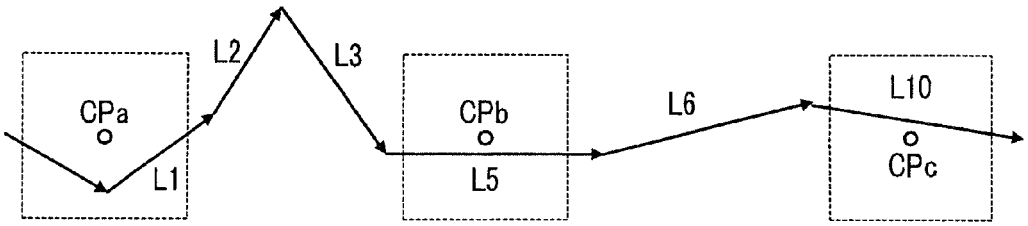

It is noted that each of the CPs do not necessarily have the attribute PD. In consideration of this, in the example shown in FIG. 30A, when the CPa has the attribute PD and when the CPb does not have the attribute PD, the candidate determination of the road is not implemented, and the road is maintained as it is. Subsequently, as shown in FIG. 30B, when the CPc has the attribute PD, the road determination is implemented for the road between the CPa and the CPc based on the attributes PD. More specifically, the NG determination is implemented for a candidate road from the link L1 through the links L2, L3, L5, L6 to the link L10 in this order, a candidate road from the link L1 through the links L4, L5, L6 to the link L10 in this order, a candidate road from the link L1 through the links L2, L3, L5, L7, L8, L9 to the link L10 in this order, and a candidate road from the link L1 through the links L4, L5, L7, L8, L9 to the link L10 in this order. In the example shown in FIG. 30C, a road from the link L1 through the links L2, L3, L5, L6, to the link L10 remains. In this case, the NG determinations are made to the road between the CPa and the CPb including the link L4 and the road between the CPb and CPc starting from the link L7 through the link L8 to the link L9.

At subsequent S424, determination is implemented according to the attribute PDM. In FIG. 4, the attribute PDM represents the spaced distance by which the object road is spaced from the straight line connected to the subsequent CP, as described above. This processing is implemented to calculate the travel distance when traveling along a way according to the attribute PDM and to determine whether the searched road is a candidate.

Specifically, the travel distance when traveling along a way is calculated based on the attribute PDM by using the subsequent formula:

$$\text{PDM travel distance} = \tfrac{1}{2} \times (\text{circumference of circle having diameter being linear distance between CPs}) \times \text{correction value} \quad \text{(Formula 5)}$$

Figures 31A, 31B:
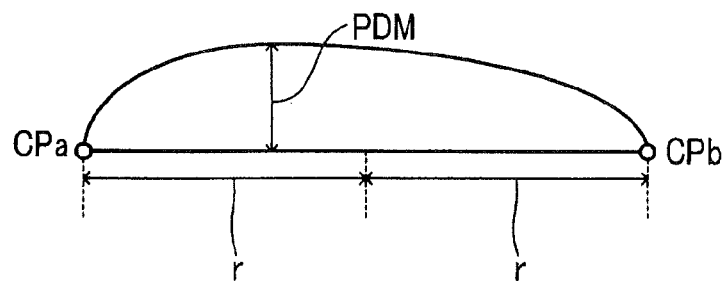
FIGS. 31A, 31B are explanatory views showing a road selection processing according to an attribute PDM.

In this processing, the correction value is found from a table according to a ratio of a half value of the linear distance between CPs to the value of the attribute PDM. Specifically, for example, in the example shown in FIG. 31A, the half value of the linear distance between the CPa and the CPb is denoted by r. In this case, the correction value corresponding to the ratio (PDM/r) is found from the table shown in FIG. 31B. The ratio (PDM/r) is the ratio of the attribute PDM to the distance r. The table shown in FIG. 31B is an exemplified portion extracted from an example table.

The travel distance along a candidate road is defined as a road travel distance. When the road travel distance satisfies a condition defined by the subsequent formula, an OK determined is made to the road:

$$\text{PDM travel distance} \times 0.5 < \text{road travel distance} < \text{PDM travel distance} \times 1.5 \quad \text{(Formula 6)}$$

<5.4.5 Output of Matching Result>

Referring to FIG. 22, at S430, a road is narrowed down according to these determination results, as described above. When a road is determined uniquely (S440: YES), a matching result is outputted at S450. The matching result includes the link IDs of all the links of the road being uniquely identified, a start-point offset distance, an end-point offset distance, and the like. The start-point offset distance represents a start position of the matching in a link including the start point of the road. Similarly, the end-point offset distance represents an end position of the matching in a link including the end point of the road.

<5.4.6 Determination of Road>

When a road is not determined uniquely (S440: NO), the road matching processing is failed. In this case, the matching result is not outputted. Otherwise, in the following cases, a road is determined uniquely.

Figure 32A:
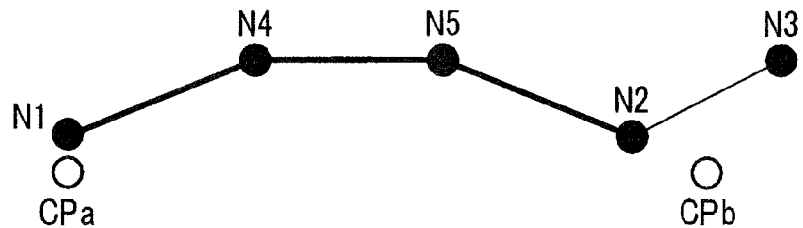
FIGS. 32A, 32B, 32C are explanatory views showing determination methods of a road.

In the example shown in FIG. 32A, it is supposed that two roads remain as a result of the road search processing for searching a road from the CPa to the CPb. One of the two is a road starting from the node N1 through the nodes N4, N5, N2 to the node N3 in this order. The other is a road starting from the node N1 through the nodes N4, N5 to the node N2 in this order. In this example, the road starting from the node N1 through the nodes N4, N5 to the node N2 represented by the thick line is included by both the two roads, and therefore, the road is determined uniquely.

Figure 32B:
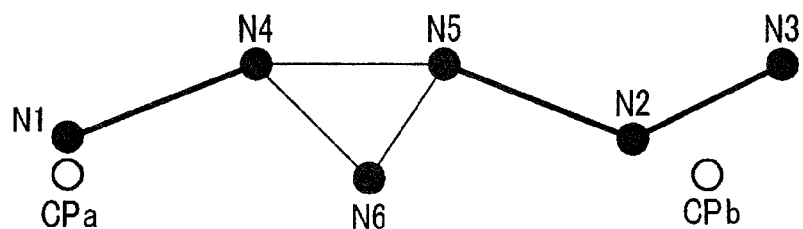

In the example shown in FIG. 32B, it is supposed that two roads remain as a result of the road search processing for searching a road from the CPa to the CPb. One of the two is a road starting from the node N1 through the nodes N4, N5, N2 to the node N3 in this order. The other is a road starting from the node N1 through the nodes N4, N6, N5, N2 to the node N3 in this order. In this example, the road starting from the node N1 to the node N4 and the road starting from the node N5 through the node N2 to the node N3 represented by the thick lines are included by both the two roads, and therefore, the roads are determined uniquely.

Figure 32C:
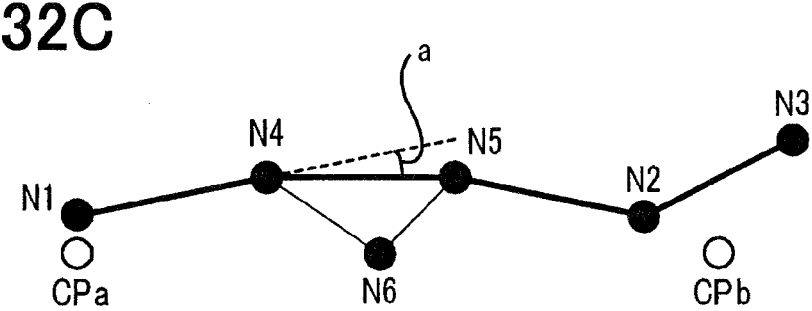

Alternatively, in the example shown in FIG. 32B, it is conceived to uniquely determine a road (along-way road) when traveling along a way. As shown in FIG. 32C, for example, the along-way road includes links at an angle denoted by the symbol a therebetween, and the angle a is less than or equal to the predetermined angle such as 15 degrees.

<6. Effect>

As described above, in the present embodiment, the candidate link search processing of FIG. 12 is implemented to narrow down the links to obtain the determination object links. Further, the candidate selection processing shown in FIG. 16 is implemented. Specifically, coincidence determination is implemented based on the non-shape-relevant attributes (S310) of the attributes of the links being the determination object. In addition, the links are narrowed down according to the determination result about the non-shape attributes (S320). Subsequently, coincidence determination is implemented about the shape-relevant attributes based on the attributes of the links being the determination object (S330). Further, a link is narrowed down according to the determination result about the shape-relevant attributes (S340).

In short, the present embodiment notes certain attributes among various attributes when the links are narrowed down. The shape-relevant attribute is related to the road shape. Therefore, when determination is implemented whether the links being the determination object match the CPs based on the shape-relevant attributes, certainty of the determination being made based on the shape-relevant attributes may become low. To the contrary, the non-shape-relevant attributes are, for example, the classification of a road and the type of a road. Therefore, coincidence determination with the attributes links and nodes can be implemented easily and accurately according to the non-shape-relevant attributes, compared with the shape-relevant attributes.

In consideration of this, links are first narrowed down based on the non-shape-relevant attributes to obtain candidate links (S310, S320). Subsequently, the candidate links are further narrowed down based on the shape-relevant attributes (S330, S340). In this way, the narrowing down of links can be effectively implemented. In addition, the pertinent link, which should be identified, can be securely narrowed down and identified from the candidate links. Consequently, the pertinent link on the map data of the navigation device 10 can be efficiently extracted from the distributed information on the core point, and the road represented by the core point can be appropriately estimated.

In addition, in the present embodiment, in advance of the processing at S320 in FIG. 16 to narrow down links obtained from the determination result of the narrowing down based on the non-shape-relevant attributes, the coincidence determination based on the non-shape-relevant attributes is implemented separately at S310. In this way, even in this case where determination is implemented based on the multiple attributes, the entire processing can be relatively simplified.

Furthermore, in the present embodiment, in the coincidence determination based on the non-shape-relevant attributes, the coincidence determination is implemented based on the attribute FC, the attribute FW, the attribute IT, the attribute RDI, the attribute DD, and the attribute AFR at S311 to S315 in FIG. 17. In this way, suitable link can be narrowed down.

In addition, in the present embodiment, in advance of the processing at S340 in FIG. 16 to narrow down links obtained from the determination result of the narrowing down based on the shape-relevant attributes, the coincidence determination based on the shape-relevant attributes is implemented separately at S330. In this way, even in this case where determination is implemented based on the multiple attributes, the entire processing can be relatively simplified.

In addition, the coincidence determination based on the shape-relevant attributes is implemented at S330 to the determination object being the links narrowed down at S320 in FIG. 16. In this way, processing load for the coincidence determination can be reduced, and processing time for the coincidence determination can be shortened.

Furthermore, in the present embodiment, in the coincidence determination based on the shape-relevant attributes, the coincidence determination is implemented based on the attribute BR, the attribute PCI, the attribute CA, and the attribute DCA at S331, S332, S337 in FIG. 18. In this way, suitable link can be narrowed down.

In the coincidence determination based on the attribute BR, on the premise that a link has an attribute representing a legally-regulated driving direction, the non-coincidence determination is implemented when the traveling direction of the link largely differs from the direction represented by the attribute BR of the object CP. Specifically, for example, referring to FIG. 19, non-coincidence determination is made when the angle between the vector, which represents the traveling direction of the link, and the vector, which is directed to the subsequent CP and represented by the attribute BR, is greater than or equal to the predetermined angle, such as 90 degrees. Thus, the coincidence determination can be implemented with a determination range in this way, thereby to enable narrowing down of a suitable link.

Further, in the determination based on the attribute CA and the attribute DCA, it is first determined which way a side road is located. Specifically, for example, referring to FIG. 21A, when the attribute CA is a negative value, it is determined that the side road is located on the left side relative to the direction, which is represented by the attribute BR and directed to the subsequent CP. Otherwise, as shown in FIG. 21B, when the attribute CA is a positive value, it is determined that the side road is located on the right side relative to the direction, which is represented by the attribute BR and directed to the subsequent CP. Subsequently, coincidence determination about the attribute CA and the attribute DCA is implemented based on the physical relationship between the link of the determination object and the side road of the link. Thus, the coincidence determination can be implemented relatively easily in this way, thereby to enable narrowing down of a suitable link.

In the present embodiment, the navigation device 10 may function as a road estimation device, the map data input device 13 may function as a map data input unit, and the CPU 17a of the control circuit 17 may function as a link extraction unit.

In addition, the processing at S310 in FIG. 16 (S311 to S315 in FIG. 17) may function as a non-shape-relevant coincidence-determination processing, the processing at S320 may function as a non-shape-relevant narrowing-down processing, the processing at S330 (S331, S332, S337 in FIG. 18) may function as a shape-relevant coincidence-determination processing, and the processing at S340 may function as a shape-relevant narrowing-down processing.

As described, above, the present invention is not limited to the above embodiment, and is capable of being applied to various embodiments as long as being undeviating from the gist thereof.

(i) In the above embodiment, in the coincidence determination according to the shape-relevant attributes (S330 in FIG. 16), only the links narrowed down based on the non-shape-relevant attribute is used as the links of the determination object. It is noted that, also in the coincidence determination based on the shape-relevant attributes, links narrowed down in the candidate link search processing of FIG. 12 may be used as the links of the determination object, similarly to the coincidence determination based on the non-shape-relevant attributes.

(ii) In the coincidence determination based on the non-shape-relevant attributes shown in FIG. 17, and in the coincidence determination based on the shape-relevant attributes shown in FIG. 18, the coincidence determination is implemented based on the multiple attributes. It is noted that the each coincidence determination may be implemented based on one of the above-described attributes or based on two or more of the above-described attributes. The coincidence determination may be made based on an attribute, such as the attribute shown in FIG. 4, not shown in the above examples.

Summarizing the above embodiment, the road estimation device is configured to extract a link corresponding to a road on the map according to the core point, the road being represented by the core point, which is assigned along the road and assigned with the attribute for identifying the road, thereby to estimate the road. In general, a core point may be transmitted in a form of an array. Nevertheless, a single item of a core point may be transmitted.

In this device, the map data input unit is configured to input the map data. The map data includes the links each having the attribute corresponding to the attribute of the core point. The link extraction unit is configured to extract candidate links being candidate of the road represented by the core points from the map data according to the attributes of the links and the attribute of the core point.

The link extraction unit is configured to first implement the non-shape-relevant narrowing-down processing, and subsequently implement the shape-relevant narrowing-down processing. The non-shape-relevant narrowing-down processing is implemented to narrow down links into candidate links, each of which has an attribute corresponding to (or coinciding with) the non-shape-relevant attribute among the attributes of the core point, according to the non-shape-relevant attribute, which is irrelevant to a road shape. The shape-relevant narrowing-down processing is implemented to subsequently narrow down the candidate links into a candidate link(s), each of which has an attribute corresponding to the shape-relevant attribute among the attributes of the core point, according to the shape-relevant attribute being relevant to the road shape.

In short, the present embodiment notes certain attributes among various attributes when the links are narrowed down. The shape-relevant attribute is related to the road shape. Therefore, when determination is implemented whether the links being the determination object match the core points based on the shape-relevant attributes, certainty of the determination being made based on the shape-relevant attributes may become low. To the contrary, the non-shape-relevant attributes are, for example, the classification of a road and the type of a road. Therefore, coincidence determination with the attributes links and nodes can be implemented easily and accurately according to the non-shape-relevant attributes, compared with the shape-relevant attributes.

In consideration of this, links are first narrowed down based on the non-shape-relevant attributes to obtain candidate links. Subsequently, the candidate links are further narrowed down based on the shape-relevant attributes. In this way, the narrowing down of links can be effectively implemented. In addition, a link, which should be identified, can be securely narrowed down and identified from the candidate links. Consequently, the pertinent link on the map data of the vehicular device can be efficiently extracted from the distributed information on the core point, and the road represented by the core point can be appropriately estimated.

More specifically, the link extraction unit may be further configured to implement the non-shape-relevant coincidence determination processing to implement coincidence determination about the non-shape-relevant attribute according to the attribute of the link being a determination object, thereby to implement the non-shape-relevant narrowing-down processing according to a result of the non-shape-relevant coincidence determination processing. The coincidence determination processing of links is implemented in advance of the narrowing-down in this way, thereby to simplify the processing even in the case where determination is made based on the multiple attributes.

Specifically, for example, in the non-shape-relevant coincidence determination processing, at least one of: an attribute FC being road classification information representing a class of a road an attribute FW being physical road type information representing a classification of a road an attribute IT being intersection classification information representing a classification of an intersection an attribute RDI being intersection name information representing a name of an intersection; and an attribute DD and an attribute AFR being flags driving direction information representing a legally-permitted driving direction and representing whether the legally-permitted driving direction is available is used. Thus, coincidence determination of the link being the determination object is implemented about In this way, suitable link can be narrowed down.

More specifically, the link extraction unit may be further configured to implement the shape-relevant coincidence determination processing to implement coincidence determination about the shape-relevant attribute according to the attribute of the link being a determination object, thereby to implement the shape-relevant narrowing-down processing according to a result of the shape-relevant coincidence determination processing. The coincidence determination processing of links is implemented in advance of the narrowing-down in this way also in the case based on the shape-relevant attribute, thereby to simplify the processing even in the case where determination is made based on the multiple attributes.

Specifically, the link extraction unit may be further configured to implement the shape-relevant coincidence determination processing only to the links narrowed down in the non-shape-relevant narrowing-down processing. The coincidence determination is implement only to the links narrowed down based on the non-shape-relevant attribute in this way, and thereby to reduce processing load for the shape-relevant coincidence determination processing and to reduce the processing time for the shape-relevant coincidence determination processing.

Specifically, for example, in the shape-relevant coincidence determination processing, at least one of: an attribute BR being core point angle information representing a geographical angle to a subsequent core point; an attribute PCI being parallel driveway information representing a driveway in a plurality of driveways in a same direction; and an attribute CA and an attribute DCA being side road information representing an angle to a side road and a connection distance to the side road, are used. Thus, coincidence determination of the link being the determination object is implemented about In this way, suitable link can be narrowed down.

In this case, it is conceivable, in the coincidence determination according to the core point angle information, to make coincidence determination when the angle, which is between the direction toward the subsequent core point based on the core point angle information and the traveling direction of a link being a determination object, is smaller than the predetermined angle. For example, referring to FIG. 19B, it is supposed that the traveling directions of links being a determination object are represented by the vectors V1, V2, V3, V4. In this case, when the angle of a link relative to the vector VB, which represents the direction toward the subsequent core point, is smaller than 90 degrees, coincidence determination is made to the link. In this example, the coincidence determination is made to the vector V1 and the vector V2. Thus, the coincidence determination can be implemented with a determination range in this way, thereby to enable narrowing down of a suitable link.

Further, it is conceived, in the coincidence determination according to the side road information, to implement determination whether a side road is located on the right side or on the left side relative to the direction toward the subsequent core point based on the core point angle information, and coincidence determination is made when the side road is located on the same side as the link being the determination object. For example, referring to FIG. 21A, when the attribute CA is a negative value, the side road may be determined to be on the left side. Alternatively, referring to FIG. 21B, when the attribute CA is a right value, the side road may be determined to be on the right side. Thus, the coincidence determination can be implemented relatively easily in this way, thereby to enable narrowing down of a suitable link.

The above processings such as calculations and determinations are not limited being executed by the control unit 17. The control unit may have various structures including the control unit 17 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A road estimation device configured to receive data including a core point from an external object, the core point being assigned along a road and being assigned with attributes for identifying the road, the road estimation device further configured to extract a link pertinent to the road represented by the core point for estimating the road on a map, the road estimation device comprising:
   a map data input unit configured to input map data including links having attributes corresponding to the attributes of the core point;
   a link extraction unit configured to extract a candidate link being candidate of the road represented by the core point from the map data according to the attribute of the link and the attributes of the core point, wherein
   the link extraction unit is further configured to:
      first implement a non-shape-relevant narrowing-down processing to narrow down links into candidate links, each of which has an attribute corresponding to a non-shape-relevant attribute of the attributes of the core point, according to the non-shape-relevant attribute being irrelevant to a road shape; and
      subsequently implement a shape-relevant narrowing-down processing to narrow down the candidate links into a candidate link, which has an attribute corresponding to a shape-relevant attribute of the attributes of the core point, according to the shape-relevant attribute being relevant to the road shape.

2. The road estimation device according to claim 1, wherein the link extraction unit is further configured to implement a non-shape-relevant coincidence determination processing to implement coincidence determination about the non-shape-relevant attribute according to an attribute of a link being a determination object, thereby to implement the non-shape-relevant narrowing-down processing according to a result of the non-shape-relevant coincidence determination processing.

3. The road estimation device according to claim 2, wherein
   the coincidence determination in the non-shape-relevant coincidence determination processing is implemented about at least one of:
   an attribute FC being road classification information representing a class of a road;
   an attribute FW being physical road type information representing a classification of a road;
   an attribute IT being intersection classification information representing a classification of an intersection;
   an attribute RDI being intersection name information representing a name of an intersection; and
   an attribute DD and an attribute AFR being driving direction information representing a legally-permitted driving direction and representing whether the legally-permitted driving direction is available.

4. The road estimation device according to claim 1, wherein the link extraction unit is further configured to implement a shape-relevant coincidence determination processing to implement coincidence determination about the shape-relevant attribute to an attribute of a link being a determination object, thereby to implement the shape-relevant narrowing-down processing according to a result of the shape-relevant coincidence determination processing.

5. The road estimation device according to claim 4, wherein the link extraction unit is further configured to implement the shape-relevant coincidence determination processing only to the candidate links into which links are narrowed down in the non-shape-relevant narrowing-down processing.

6. The road estimation device according to claim 4, wherein
   the coincidence determination in the shape-relevant coincidence determination processing is implemented about at least one of:

an attribute BR being core point angle information representing a geographical angle to a subsequent core point;

an attribute PCI being parallel driveway information representing a driveway in a plurality of driveways in a same direction; and an attribute CA and an attribute DCA being side road information representing an angle to a side road and a connection distance to the side road.

7. The road estimation device according to claim 6, wherein coincidence determination is made in the coincidence determination about the core point angle information, when an angle, which is between a direction toward a subsequent core point determined based on the core point angle information and a traveling direction of a link being a determination object, is smaller than a predetermined angle.

8. The road estimation device according to claim 6, wherein determination is implemented, in the coincidence determination about the side road information, whether a side road is located on a right side or on a left side relative to a direction toward a subsequent core point determined based on the core point angle information, and coincidence determination is made when the side road is located on a same side as the link being the determination object.

9. The road estimation device according to claim 1, wherein the link extraction unit is further configured to:

determine coincidence between the non-shape-relevant attribute of the core point and an attribute of a link being a determination object; and implement the non-shape-relevant narrowing-down processing according to a determination result of the coincidence of the non-shape-relevant attribute.

10. The road estimation device according to claim 1, wherein the link extraction unit is further configured to:

determine coincidence between the shape-relevant attribute of the core point and an attribute of a link being a determination object; and implement the shape-relevant narrowing-down processing according to a determination result of the coincidence of the shape-relevant attribute.

11. A method for estimating a road, the method comprising:

receiving data including a core point from an external object, the core point being assigned along a road and being assigned with attributes for identifying the road, the attributes of the core point including a non-shape-relevant attribute and a shape-relevant attribute, the non-shape-relevant attribute being irrelevant to a road shape, and the shape-relevant attribute being relevant to the road shape;

inputting map data including links each having an attribute;

first narrowing down links into candidate links each having an attribute corresponding to the non-shape-relevant attribute of the core point; and second narrowing down the candidate links into a candidate link having an attribute corresponding to the shape-relevant attribute of the core point thereby to extract the candidate link being candidate of the road represented by the core point from the map data.

\* \* \* \* \*